(12) United States Patent
Sze et al.

(10) Patent No.: US 11,578,460 B2
(45) Date of Patent: Feb. 14, 2023

(54) PAPERMAKING BELTS HAVING OFFSET OPENINGS, PAPERMAKING PROCESSES USING BELTS HAVING OFFSET OPENINGS, AND PAPER PRODUCTS MADE THEREFROM

(71) Applicant: GPCP IP Holdings LLC, Atlanta, GA (US)

(72) Inventors: Daniel Hue Ming Sze, Appleton, WI (US); Frank D. Harper, Neenah, WI (US); Kevin Aaron Hawkins, Neenah, WI (US); Eric J. Lepp, Combined Locks, WI (US); Vipul Kumar, Appleton, WI (US); Nathan Capps, Appleton, WI (US); Joseph H. Miller, Neenah, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days.

(21) Appl. No.: 17/010,538

(22) Filed: Sep. 2, 2020

(65) Prior Publication Data
US 2021/0087748 A1 Mar. 25, 2021

Related U.S. Application Data

(60) Provisional application No. 62/905,058, filed on Sep. 24, 2019.

(51) Int. Cl.
*D21F 7/08* (2006.01)
*B32B 3/26* (2006.01)
(Continued)

(52) U.S. Cl.
CPC .............. *D21F 7/083* (2013.01); *B32B 3/266* (2013.01); *B32B 27/08* (2013.01); *D21F 11/006* (2013.01); *D21F 11/14* (2013.01); *D21H 27/002* (2013.01); *D21H 27/02* (2013.01); *B32B 2250/24* (2013.01); *B32B 2413/00* (2013.01)

(58) Field of Classification Search
CPC ........ D21F 7/083; D21F 11/006; D21F 11/14; B32B 3/266; B32B 27/08; B32B 2250/24;
(Continued)

(56) References Cited

U.S. PATENT DOCUMENTS 4,529,480 A   7/1985 Trokhan
5,334,289 A * 8/1994 Trokhan ................ D21H 27/02
                                              162/902
(Continued)

FOREIGN PATENT DOCUMENTS

WO        00/19014 A1    4/2000
WO     WO-0019014 A1 *   4/2000   ............ D21F 11/006
WO      2016/049405 A1   3/2016

OTHER PUBLICATIONS

International Search Report and Written Opinion dated Dec. 3, 2020, issued in corresponding International Patent Application No. PCT/IB2020/058577.
(Continued)

*Primary Examiner* — Jacob T Minskey
*Assistant Examiner* — Matthew M Eslami

(57) ABSTRACT

A belt for creping a web in a papermaking process. The belt includes a surface onto which the web is transferred during the papermaking process. A plurality of openings extend through the surface, with the openings being arranged in lines that are offset from lines in the machine direction (MD) and cross-machine direction (CD) of the belt. Paper products, such as absorbent sheets, made from the belt have hollow dome regions and connecting regions between the domes, with the domes being arranged in lines that are offset from lines in the MD and CD of the paper products.

37 Claims, 22 Drawing Sheets

(51) Int. Cl.
  *B32B 27/08* (2006.01)
  *D21H 27/00* (2006.01)
  *D21F 11/14* (2006.01)
  *D21F 11/00* (2006.01)
  *D21H 27/02* (2006.01)

(58) Field of Classification Search
  CPC ............ B32B 2413/00; B32B 2250/20; B32B 2262/0269; B32B 2274/00; B32B 5/26; B32B 7/08; B32B 15/06; B32B 15/095; B32B 15/14; B32B 25/08; B32B 27/34; B32B 27/36; B32B 2250/02; B32B 2307/724; B32B 5/024; B32B 25/10; B32B 2255/10; B32B 2433/02; B32B 7/12; B32B 27/12; B32B 27/40; B32B 1/12; D21H 27/002; D21H 27/02; D21H 1/0036; B31F 1/12
  See application file for complete search history.

(56) References Cited

U.S. PATENT DOCUMENTS

| | | | | |
|---|---|---|---|---|
| 5,679,222 | A | * | 10/1997 | Rasch .................... B29C 43/28 162/358.1 |
| 8,293,072 | B2 | * | 10/2012 | Super ........................ B31F 1/16 162/109 |
| 8,394,239 | B2 | | 3/2013 | Eagles et al. |
| 9,863,095 | B2 | | 1/2018 | Sze et al. |

OTHER PUBLICATIONS

Garcia, D., "Robust smoothing of gridded data in one and higher dimensions with missing values", Computational Statistics & Data Analysis, vol. 54, Issue 4, Apr. 1, 2010, pp. 1167-1178.

International Preliminary Report on Patentability received for PCT Application No. PCT/IB2020/058577, dated April 7, 2022, 8 pages.

* cited by examiner

| | BELT 1 | BELT 2 | BELT 3 | BELT 4 | BELT 5 | BELT 6 |
|---|---|---|---|---|---|---|
| PHOTOMICROGRAPH OF TOP SURFACE | 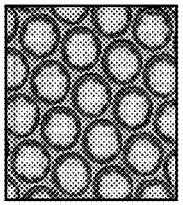 | 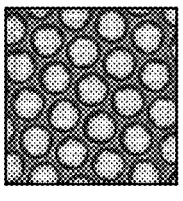 | 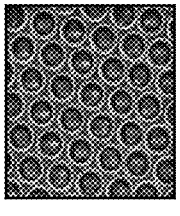 | 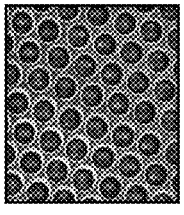 | 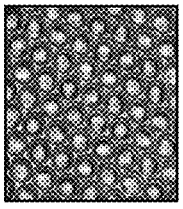 | 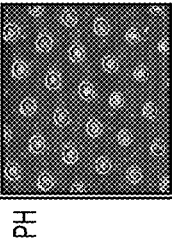 |
| DIAMETER OF OPENINGS (mm) | 0.8 | 1.25 | 1.4 | 1.55 | 2.0 | 2.2 |
| TOP SURFACE % OPEN AREA | 17.3 | 78.3 | 71.1 | 73.8 | 74.8 | 79.1 |
| UNIT VOLUME OF OPENINGS (mm$^3$) | 0.30 | 0.84 | 0.99 | 2.63 | 2.45 | 3.33 |
| COLUMNS/cm | 5.85 | 4.24 | 3.88 | 3.39 | 4.74 | 4.28 |
| ROWS/cm | 6.72 | 14.85 | 12.98 | 11.46 | 5.53 | 4.88 |
| HOLES/cm$^2$ | 39 | 63 | 50 | 39 | 26 | 21 |
| ROTATION ANGLE OF LINES OPENINGS FROM MD LINE (CLOCKWISE) | 14 | 14 | 13 | 16 | 12 | 15 |
FIG. 7

| FABRIC CREPE | MOLDING BOX VACUUM (in. Hg) | BASIS WEIGHT (lbs/rm) | CALIPER (mil/8 sht) | BS BULK (cc/g) | MD TENSILE (g/3") | CD TENSILE (g/3") | GM TENSILE (g/3") | TENSILE RATIO | MD STRETCH (%) | CD STRETCH (%) | CD WET TENSILE (g/3") | WET/DRY RATIO (%) | SAT CAPACITY (g/sq m) | SAT CAPACITY (g/g) | SAT RATE (g/sec^0.5) | GM BREAK MODULUS (g/%) |
|---|---|---|---|---|---|---|---|---|---|---|---|---|---|---|---|---|
| 15 | 5 | 15.70 | 85.9 | 10.7 | 1838 | 1706 | 1,771 | 1.08 | 17.1 | 6.2 | 445 | 26.1 | 430 | 8.4 | 0.12 | 175.2 |
| 20 | 5 | 16.14 | 90.3 | 10.9 | 1892 | 2094 | 1,990 | 0.90 | 23.5 | 6.2 | 600 | 28.7 | 426 | 8.1 | 0.15 | 166.3 |
| 25 | 5 | 16.54 | 96.8 | 11.4 | 1516 | 1657 | 1,585 | 0.92 | 28.6 | 6.7 | 505 | 30.4 | 436 | 8.1 | 0.14 | 116.7 |
| 30 | 5 | 16.41 | 111.3 | 13.2 | 1561 | 1707 | 1632 | 0.92 | 33.2 | 8.1 | 472 | 27.6 | 458 | 8.6 | 0.10 | 100.7 |
| 15 | 12 | 16.34 | 110.6 | 13.2 | 1810 | 1460 | 1,625 | 1.24 | 18.9 | 8.1 | 428 | 29.3 | 477 | 9.0 | 0.12 | 133.8 |
| 20 | 12 | 16.29 | 118.9 | 14.2 | 1609 | 1680 | 1,644 | 0.96 | 24.2 | 8.8 | 507 | 30.2 | 478 | 9.0 | 0.10 | 114.4 |
| 25 | 12 | 16.49 | 132.5 | 15.7 | 1306 | 1371 | 1,338 | 0.95 | 28.2 | 8.0 | 393 | 28.7 | 554 | 10.3 | 0.16 | 90.7 |
| 30 | 12 | 16.28 | 136.4 | 16.3 | 1299 | 1406 | 1351 | 0.92 | 35.7 | 9.1 | 430 | 30.6 | 558 | 10.5 | 0.18 | 75.8 |
| 15 | 23 | 16.30 | 139.6 | 16.7 | 1493 | 1380 | 1,435 | 1.08 | 19.6 | 9.3 | 387 | 28.0 | 504 | 9.5 | 0.13 | 107.6 |
| 20 | 23 | 15.86 | 142.4 | 17.5 | 1517 | 1558 | 1,537 | 0.97 | 23.8 | 8.1 | 477 | 30.6 | 531 | 10.3 | 0.14 | 112.0 |
| 25 | 23 | 16.08 | 145.3 | 17.6 | 1164 | 1185 | 1174 | 0.99 | 31.0 | 10.1 | 342 | 28.8 | 563 | 10.8 | 0.15 | 67.8 |
| 30 | 23 | 16.33 | 150.9 | 18.0 | 1182 | 1214 | 1198 | 0.97 | 36.3 | 10.4 | 361 | 29.7 | 580 | 10.9 | 0.15 | 62.0 |

*FIG. 13*

| PROPERTY | CONVERSION A | CONVERSION B | CONVERSION C |
|---|---|---|---|
| BASIS WEIGHT (lbs/ream) | 31.91 | 31.25 | 27.05 |
| CALIPER (mils/8 SHEETS) | 235.8 | 240.2 | 195.5 |
| MD TENSILE (g/3") | 2,817 | 2,879 | 2,716 |
| CD TENSILE (g/3") | 2,705 | 2,694 | 2,557 |
| GM TENSILE (g/3") | 2,761 | 2,785 | 2,635 |
| TENSILE RATIO | 1.04 | 1.07 | 1.06 |
| MD STRETCH (%) | 25.0 | 28.3 | 23.2 |
| CD STRETCH (%) | 8.7 | 9.9 | 8.5 |
| CD WET TENSILE - FINCH (g/3") | 792 | 738 | 794 |
| CD WET/DRY - FINCH (%) | 29.3 | 27.4 | 31.0 |
| PERF TENSILE (g/3") | 793 | 757 | 849 |
| SAT CAPACITY (g/sq METER) | 533 | 492 | 481 |
| SAT CAPACITY (g/g) | 10.3 | 9.7 | 10.9 |
| SAT RATE (g/sec^0.5) | 0.16 | 0.11 | 0.10 |
| GM BREAK MODULUS (g/%) | 186.3 | 167.8 | 186.7 |
| MACBETH 3100 BRIGHTNESS (%) | 79.7 | 85.8 | 86.0 |
| MACBETH 3100 L* | 94.9 | 96.4 | 96.4 |
| MACBETH 3100 a* | -1.1 | -1.0 | -1.0 |
| MACBETH 3100 b* | 6.1 | 4.0 | 3.9 |
| ROLL DIAMETER (in) | 5.4 | 5.4 | 6.1 |
| ROLL COMPRESSION (%) | 5.1 | 4.4 | 3.0 |
| SENSORY SOFTNESS | 6.8 | 8.6 | 7.5 |

*FIG. 14*

| FURNISH (%) | FC/RC | BASIS WEIGHT (lbs/rm) | CALIPER (mil/ 8 sht) | MD TENSILE (g/3") | MD STRETCH (%) | CD TENSILE (g/3") | CD STRETCH (%) | CD WET TENSILE (g/3") | GMT | BREAK MODULUS | TENSILE RATIO | TOTAL TENSILE | WET/DRY RATIO (%) | BASIS Wt. (RAW) | TEA (CD) | TEA (MD) | BREAK MODULUS CD (g/%) | BREAK MODULUS CD (g/%) |
|---|---|---|---|---|---|---|---|---|---|---|---|---|---|---|---|---|---|---|
| 65 HW 35 SW | 23/8 | 13.5 | 81.6 | 621 | 34.4 | 321 | 12.9 | 51.2 | 446 | 21.2 | 1.9 | 942 | 0.16 | 1.024 | 0.293 | 1.076 | 24.97 | 18.14 |
| 65 HW 35 SW | 23/8 | 13.4 | 79.4 | 548.6 | 33.6 | 273.3 | 12.1 | 39.1 | 386.9 | 19.0 | 2.0 | 821.9 | 0.1 | 1.0 | 0.2 | 0.9 | 22.0 | 16.4 |
| 65 HW 35 SW | 23/8 | 13.8 | 80.8 | 710.1 | 33.4 | 332.8 | 11.7 | 55.5 | 486.0 | 24.5 | 2.1 | 1043.0 | 0.2 | 1.0 | 0.3 | 1.2 | 28.1 | 21.4 |
| 65 HW 35 SW | 23/8 | 12.2 | 83.3 | 486.1 | 35.1 | 242.1 | 12.1 | 35.4 | 342.5 | 17.0 | 2.0 | 728.2 | 0.1 | 0.9 | 0.2 | 0.9 | 20.4 | 14.1 |
| 65 HW 35 SW | 23/8 | 12.3 | 80.5 | 629.7 | 33.8 | 300.1 | 11.2 | 43.3 | 434.5 | 22.2 | 2.1 | 929.8 | 0.1 | 0.9 | 0.2 | 1.1 | 26.7 | 18.5 |
| 65 HW 35 SW | 23/8 | 12.3 | 81.0 | 721.2 | 33.5 | 366.7 | 10.4 | 49.5 | 514.2 | 27.1 | 2.0 | 1087.9 | 0.1 | 0.9 | 0.3 | 1.2 | 33.9 | 21.6 |
| 65 HW 35 SW | 23/8 | 16.0 | 95.6 | 514.2 | 38.1 | 263.1 | 13.8 | 34.8 | 367.7 | 16.2 | 2.0 | 777.3 | 0.1 | 1.2 | 0.3 | 1.0 | 19.2 | 13.7 |
| 65 Euc 35 NSWK | 23/8 | 15.8 | 103.1 | 476.9 | 39.5 | 258.3 | 13.9 | 33.6 | 350.9 | 14.9 | 1.8 | 735.2 | 0.1 | 1.2 | 0.3 | 0.9 | 18.5 | 12.0 |
| 65 Euc 35 NSWK | 23/8 | 15.8 | 112.5 | 511.7 | 41.0 | 268.5 | 13.9 | 31.0 | 370.6 | 15.4 | 1.9 | 780.2 | 0.1 | 1.2 | 0.3 | 1.0 | 18.9 | 12.6 |
| 65 Euc 35 NSWK | 23/8 | 15.5 | 86.8 | 491.8 | 35.7 | 255.8 | 12.6 | 37.1 | 354.6 | 16.5 | 1.9 | 747.5 | 0.1 | 1.1 | 0.2 | 0.9 | 19.8 | 13.7 |
| 65 Euc 35 NSWK | 23/8 | 13.7 | 82.7 | 504.4 | 37.0 | 254.1 | 13.7 | 29.5 | 358.0 | 15.7 | 2.0 | 758.5 | 0.1 | 1.0 | 0.3 | 0.9 | 18.2 | 13.5 |
| 65 Euc 35 NSWK | 23/8 | 13.6 | 80.9 | 648.1 | 36.2 | 325.2 | 14.3 | 37.0 | 459.0 | 20.1 | 2.1 | 973.2 | 0.1 | 1.1 | 0.3 | 1.1 | 22.7 | 17.8 |
| 65 Euc 35 NSWK | 23/8 | 13.8 | 84.4 | 769.0 | 36.6 | 367.3 | 14.1 | 40.6 | 531.3 | 23.9 | 1.9 | 1136.3 | 0.1 | 1.0 | 0.4 | 1.3 | 26.3 | 21.8 |
| 65 Euc 35 NSWK | 23/8 | 12.6 | 80.4 | 530.2 | 35.7 | 278.4 | 13.9 | 29.7 | 384.2 | 17.1 | 1.9 | 808.6 | 0.1 | 1.0 | 0.3 | 0.9 | 19.6 | 14.9 |
| 65 Euc 35 NSWK | 23/8 | 12.8 | 82.0 | 612.6 | 37.8 | 313.0 | 13.4 | 32.2 | 437.6 | 19.4 | 2.0 | 925.5 | 0.1 | 1.0 | 0.3 | 1.0 | 23.3 | 16.1 |
| 65 Euc 35 NSWK | 23/8 | 12.6 | 82.8 | 712.0 | 38.5 | 324.0 | 13.6 | 35.3 | 480.2 | 20.8 | 2.2 | 1036.0 | 0.1 | 1.0 | 0.3 | 1.2 | 23.6 | 18.4 |

FIG. 15

| FURNISH (%) | FC/RC | BASIS WEIGHT (lbs/rm) | CALIPER (mil/ 8 sht) | MD TENSILE (g/3") | MD STRETCH (%) | CD TENSILE (g/3") | CD STRETCH (%) | CD WET TENSILE (g/3") | GMT | BREAK MODULUS | TENSILE RATIO | TOTAL TENSILE | WET/DRY RATIO (%) | BASIS Wt. (RAW) | TEA (CD) | TEA (MD) | BREAK MODULUS CD (g/%) | BREAK MODULUS CD (g/%) |
|---|---|---|---|---|---|---|---|---|---|---|---|---|---|---|---|---|---|---|
| 100 Euc | 23/8 | 13.4 | 82.0 | 530.2 | 32.9 | 296.8 | 12.7 | 37.9 | 396.6 | 19.5 | 1.8 | 827.1 | 0.1 | 1.0 | 0.3 | 0.9 | 23.7 | 16.1 |
| 100 Euc | 23/8 | 13.6 | 79.0 | 609.4 | 34.7 | 301.3 | 13.3 | 40.6 | 428.3 | 20.1 | 2.0 | 910.7 | 0.1 | 1.0 | 0.3 | 1.1 | 22.8 | 17.8 |
| 100 Euc | 23/8 | 13.4 | 81.9 | 736.3 | 34.8 | 356.3 | 12.5 | 40.9 | 512.1 | 24.5 | 2.1 | 1092.6 | 0.1 | 1.0 | 0.3 | 1.2 | 28.2 | 21.3 |
| 100 Euc | 23/8 | 12.5 | 82.7 | 587.9 | 33.7 | 298.9 | 13.0 | 33.8 | 419.1 | 20.4 | 2.0 | 886.8 | 0.1 | 0.9 | 0.3 | 1.0 | 23.4 | 17.8 |
| 100 Euc | 23/8 | 13.9 | 90.0 | 716.5 | 35.7 | 361.9 | 12.7 | 42.7 | 508.9 | 23.8 | 2.0 | 1078.3 | 0.1 | 1.1 | 0.3 | 1.2 | 28.5 | 20.0 |
| 100 Euc | 23/8 | 14.7 | 84.5 | 637.7 | 34.0 | 322.5 | 11.7 | 37.9 | 453.3 | 22.3 | 2.0 | 960.2 | 0.1 | 1.1 | 0.3 | 1.1 | 26.8 | 18.5 |
| 100 Euc | 23/8 | 14.9 | 83.5 | 781.1 | 35.2 | 394.3 | 11.4 | 45.0 | 555.0 | 28.4 | 2.0 | 1175.4 | 0.1 | 1.1 | 0.3 | 1.3 | 35.3 | 22.9 |
| 100 Euc | 23/8 | 14.6 | 108.1 | 807.2 | 37.9 | 394.5 | 13.0 | 54.4 | 564.2 | 25.2 | 2.0 | 1201.6 | 0.1 | 1.1 | 0.4 | 1.3 | 29.9 | 21.2 |
| 65 Euc 35 NSWK | 23/8 | 13.6 | 89.7 | 623.8 | 36.6 | 310.7 | 13.4 | 33.1 | 440.2 | 19.5 | 2.0 | 934.5 | 0.1 | 1.1 | 0.3 | 1.3 | 23.0 | 16.5 |
| 65 Euc 35 NSWK | 23/8 | 15.2 | 91.2 | 637.8 | 35.3 | 328.5 | 13.5 | 46.0 | 457.7 | 21.4 | 1.9 | 966.3 | 0.1 | 1.1 | 0.3 | 1.1 | 25.1 | 18.3 |
| 65 Euc 35 NSWK | 23/8 | 13.6 | 86.9 | 500.7 | 35.4 | 258.0 | 13.4 | 28.0 | 359.0 | 16.5 | 2.0 | 758.6 | 0.1 | 1.0 | 0.2 | 0.9 | 19.3 | 14.2 |
| 65 Euc 35 NSWK | 23/8 | 14.0 | 82.7 | 820.8 | 37.5 | 378.9 | 13.4 | 39.2 | 557.7 | 25.3 | 2.2 | 1199.7 | 0.1 | 1.1 | 0.4 | 1.4 | 28.5 | 22.5 |

FIG. 16

| FURNISH (%) | FC/RC | BASIS WEIGHT (lbs/rm) | CALIPER (mil/ 8 sht) | MD TENSILE (g/3") | MD STRETCH (%) | CD TENSILE (g/3") | CD STRETCH (%) | CD WET TENSILE (g/3") | GMT | BREAK MODULUS | TENSILE RATIO | TOTAL TENSILE | WET/DRY RATIO (%) | BASIS Wt. (RAW) | TEA (CD) | TEA (MD) | BREAK MODULUS CD (g/%) | BREAK MODULUS CD (g/%) |
|---|---|---|---|---|---|---|---|---|---|---|---|---|---|---|---|---|---|---|
| 65 HW 35 SW | 23/8 | 12.6 | 89.2 | 575.1 | 34.8 | 300.8 | 12.1 | 39.7 | 415.9 | 21.0 | 1.9 | 875.9 | 0.1 | 1.0 | 0.3 | 1.0 | 26.8 | 16.5 |
| 65 HW 35 SW | 23/8 | 13.8 | 90.4 | 645.8 | 33.8 | 339.2 | 11.2 | 48.2 | 468.0 | 24.1 | 1.9 | 985.0 | 0.1 | 1.0 | 0.3 | 1.1 | 30.4 | 19.2 |
| 65 HW 35 SW | 23/8 | 15.1 | 83.0 | 644.5 | 31.9 | 328.6 | 11.3 | 41.0 | 460.2 | 24.4 | 2.0 | 973.1 | 0.1 | 1.1 | 0.3 | 1.1 | 28.5 | 20.9 |
| 65 HW 35 SW | 23/8 | 14.9 | 82.1 | 733.2 | 32.7 | 372.7 | 10.9 | 43.1 | 522.8 | 27.8 | 2.0 | 1106.0 | 0.1 | 1.1 | 0.3 | 1.2 | 34.1 | 22.8 |

*FIG. 17*

| PROPERTY | CONVERSION A | CONVERSION B | CONVERSION C |
|---|---|---|---|
| BASIS WEIGHT (lbs/ream) | 25.1 | 25.7 | 20.1 |
| CALIPER (mils/8 SHEETS) | 136 | 137 | 183 |
| MD TENSILE (g/3") | 1154 | 1076 | 865 |
| CD TENSILE (g/3") | 655 | 624 | 483 |
| GM TENSILE (g/3") | 869 | 819 | 646 |
| MD STRETCH (%) | 20.3 | 23 | 25 |
| CD STRETCH (%) | 12 | 13 | 13 |
| GM BREAK MODULUS (g/%) | 56.8 | 48.3 | 34.7 |
| MACBETH BRIGHTNESS (%) | 84.4 | 87.9 | 88.8 |
| MACBETH COLOR | 5.1 | 3.9 | 3.9 |
| ROLL DIAMETER (in) | 4.6 | 4.6 | 4.4 |
| ROLL COMPRESSION (%) | 3.6 | 3.5 | 3.7 |
| SENSORY SOFTNESS | 19.2 | 19.8 | 20.1 |

*FIG. 18*

PAPERMAKING BELTS HAVING OFFSET OPENINGS, PAPERMAKING PROCESSES USING BELTS HAVING OFFSET OPENINGS, AND PAPER PRODUCTS MADE THEREFROM

CROSS REFERENCE TO RELATED APPLICATION

This application is based on U.S. Provisional Patent Application No. 62/905,058, filed Sep. 24, 2019, which is hereby incorporated by reference in its entirety.

BACKGROUND

Field of the Invention

Our invention relates to belts that can be used in papermaking processes. Our invention also relates to papermaking processes that include the use of such belts. Our invention still further relates to paper products having exceptional properties.

Related Art

Belts are sometimes used in papermaking machine as part of a papermaking process. Examples of belts, and paper products made from such belts, are described in U.S. Pat. No. 9,863,095 B2, which is incorporated herein by reference in its entirety. As discussed in that patent, a belt is used as a creping structure in an operation that occurs under pressure in a nip, with a nascent web of cellulosic fibers being forced into openings in the top surface of the belt. Subsequent to the creping operation, a vacuum may also be used to further draw the web into the openings in the creping structure. After the shaping operations are complete and the web is fully dried, the resulting paper products have a structure that includes hollow domes that were formed in the openings of the belt, and connecting regions between the domes, with the connecting regions having been formed on the top surface of the belt. Thus, the openings in a creping belt have a demonstrable effect on the resulting paper structure from a papermaking process.

As evident from the pictures of the paper products disclosed in the aforementioned U.S. Pat. No. 9,863,095 B2, the openings in the belts used to make the products were aligned in at least one of the machine direction (MD) and the cross machine direction (CD) of the belt. A similar example of a belt known in the art with aligned openings is shown U.S. Pat. No. 4,529,480. This patent describes a deflection member in the form of an endless belt that can be used in a papermaking machine. The patent indicates that the endless belt includes deflection conduits in the form of hexagonal openings, which the patent asserts are arranged in a bilaterally staggered array. In the array of conduits shown in FIG. 2 of the patent, each conduit does not align with the immediately adjacent conduits. But, the conduits are arranged in lines that run along the MD direction of the belt, and the conduits are also arranged along lines that run in the CD direction of the belt.

One of the more difficult parts of a papermaking process is a transfer of the nascent web onto the creping structure (e.g., belt) in the creping nip. At this point in the papermaking process, the web is unstable due to its high moisture content, and it is therefore difficult to move the web onto the creping structure in a consistent manner. But, in order to produce high quality products, the transfer operation needs to be consistent such that the shaping of the web that occurs in the creping nip is effective to achieve the desired properties in the products. Thus, there is a need to design creping belts that facilitate the transfer operation as much as possible.

SUMMARY OF THE INVENTION

According to one aspect, our invention relates to a belt for creping a web in a papermaking process. The belt comprises a first layer formed from a polymeric material, the first layer providing a first surface of the belt on which the web is deposited, and the first layer having a plurality of openings extending therethrough. The openings are arranged in lines that are offset from lines in both the machine direction (MD) and cross-machine direction (CD) of the belt such that (i) for every line along the MD, a length of the line across an opening is different from lengths of the line across adjacent openings on both sides of the opening, and (ii) for each line along the CD, a length of the line across an opening is different from lengths of the across adjacent openings on both sides of the opening. The belt also comprises a second layer attached to the layer attached to the first layer, the second layer providing a second surface of the belt.

According to another aspect, our invention relates to a belt for creping a web in a papermaking process. The belt includes a first layer formed from a polymeric material, the first layer providing a first surface of the belt on which the web is deposited, and the first layer having a plurality of openings extending therethrough. The openings are arranged (i) in a repeating patterns of openings arranged around one center opening, (ii) such that the openings are not mirrored about a line that extends along a diameter of the center opening in the machine direction (MD), and (iii) such that the opening are not mirrored about a line that extends along a diameter of the center opening in the cross-machine direction (CD). The belt also includes a second layer attached to the first layer, with the second layer providing a second surface of the belt.

According to a further aspect, our invention relates to a belt for creping a web in a papermaking process. The belt includes a first layer formed from a polymeric material, the first layer providing a first surface of the belt on which the web is deposited, and the first layer having a plurality of openings extending therethrough. The openings are arranged in patterns that have an angle of rotational symmetry of sixty degrees and an order of rotational symmetry of six. The belt also includes a second layer attached to the first layer, the second layer providing a second surface of the belt.

According to another aspect, our invention relates to a belt for creping a web in a papermaking process. The belt includes a first layer formed from a polymeric material, the first layer providing a first surface of the belt on which the web is deposited, and the first layer having a plurality of openings extending therethrough, with the openings being arranged in patterns such that repeating peaks of MD line contact profile sums occur below about 0.55 mm along the CD. The belt also includes a second layer attached to the first layer, the second layer providing a second surface of the belt.

According to a further aspect, our invention relates to an absorbent sheet of cellulosic fibers that has an upper side and a lower side. The absorbent sheet includes a plurality of hollow domed regions having elliptical shapes and projecting from the upper side of the sheet, the plurality of domes being arranged in lines that are rotated by about 13 degrees to about 21 degrees relative to a line along the MD of the absorbent sheet, and major axes of the plurality of domes are formed at median average angle of about 4 degrees to about 5 degrees in a clockwise direction relative to a line along the CD of the absorbent sheet. The sheet also includes connecting regions forming a network interconnecting the hollow domed regions of the sheet.

According to a still further aspect, our invention relates to a method of making a belt-creped absorbent cellulosic sheet. The method comprises forming a nascent web from a papermaking furnish, the nascent web having a generally random distribution of papermaking fibers, transferring the nascent web to a translating transfer surface that is moving at a transfer speed, drying the nascent web to form a web having a consistency of about 30% to about 60%, and creping the web from the transfer surface using a creping belt provided with a plurality of openings arranged in lines that are offset in the machine direction (MD) and in lines that are offset in the cross machine direction (CD), wherein nip parameters, velocity delta, and web consistency are configured such that a line at which the web first contacts the creping belt extends substantially in the CD direction across a plurality of the lines of the openings offset in the MD direction before substantially extending in an MD direction. The method also includes a step of drying the web to form the belt-creped absorbent cellulosic sheet.

BRIEF DESCRIPTION OF THE DRAWINGS

FIG. 7 is a table showing characteristics of creping belts according to embodiments of the invention.

FIGS. 13-18 are tables showing properties of basesheets and converted products made according to embodiments of the invention.

DETAILED DESCRIPTION OF THE INVENTION

Figure 1:
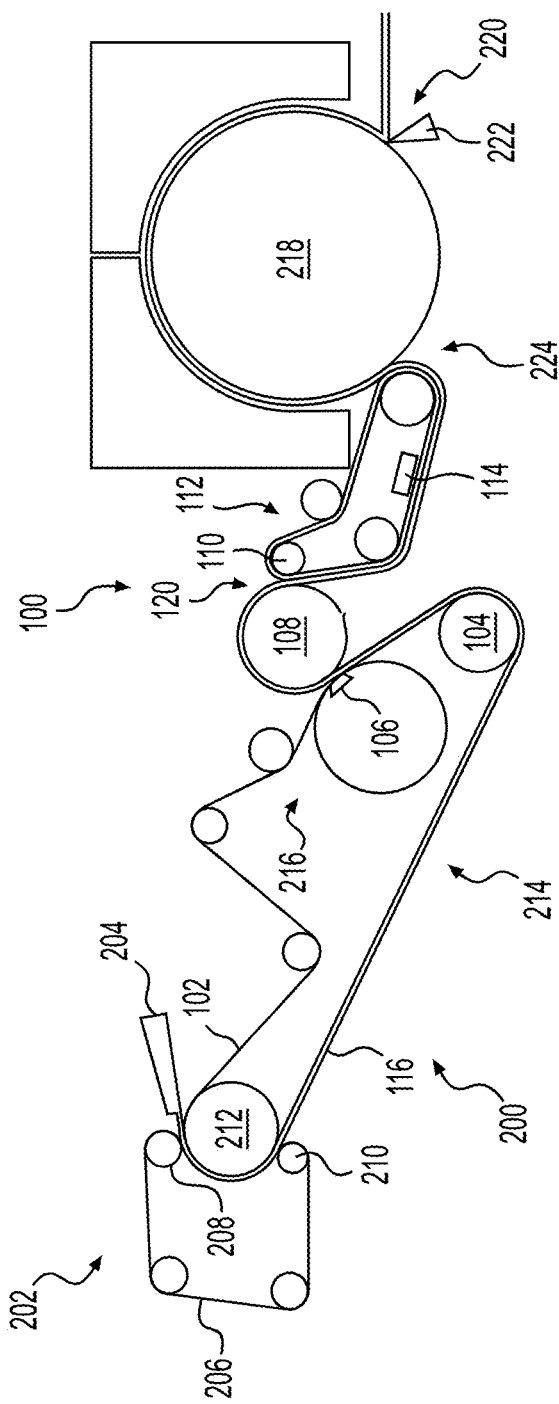
FIG. 1 is a schematic view of a papermaking machine configuration that can be used in conjunction with the present invention.

In one aspect, our invention relates to creping belts for use in papermaking processes. Our invention further relates to papermaking processes that use a creping belt. Our invention still further relates to paper products having exceptional properties. In particular embodiments, the creping belts have offset openings that provide surprising improvements to the papermaking processes and paper products.

The term "paper products" as used herein encompasses any product incorporating papermaking fiber having cellulose as a major constituent. This would include, for example, products marketed as paper towels, toilet paper, facial tissues, etc. Papermaking fibers include virgin pulps or recycle (secondary) cellulosic fibers, or fiber mixes comprising cellulosic fibers. Wood fibers include, for example, those obtained from deciduous and coniferous trees, including softwood fibers, such as northern and southern softwood kraft fibers, and hardwood fibers, such as eucalyptus, maple, birch, aspen, or the like. Examples of fibers suitable for making the webs of our invention include non-wood fibers, such as cotton fibers or cotton derivatives, abaca, kenaf, sabai grass, flax, esparto grass, straw, jute hemp, bagasse, milkweed floss fibers, and pineapple leaf fibers. "Furnishes" and like terminology refers to aqueous compositions including papermaking fibers, and, optionally, wet strength resins, debonders, and the like, for making paper products.

As used herein, the initial fiber and liquid mixture that is dried to a finished product in a papermaking process will be referred to as a "web" and/or a "nascent web." The dried, single-ply product from a papermaking process will be referred to as a "basesheet." Further, the product of a papermaking process may be referred to as an "absorbent sheet." In this regard, an absorbent sheet may be the same as a single basesheet. Alternatively, an absorbent sheet may include a plurality of basesheets, as in a multi-ply structure. Further, an absorbent sheet may have undergone additional processing after being dried in the initial basesheet forming process, e.g., embossing.

When describing our invention herein, the terms "machine-direction" (MD) and "cross machine-direction" (CD) will be used in accordance with their well-understood meaning in the art. That is, the MD of a belt or other creping structure refers to the direction that the belt or other creping structure moves in a papermaking process, while CD refers to a direction crossing the MD of the belt or creping structure. Similarly, when referencing paper products, the MD of the paper product refers to the direction on the product that the product moved in the papermaking process, and the CD refers to the direction on the paper product crossing the MD of the product.

Papermaking Machines

Processes utilizing the inventive belts and making the inventive products may involve compactly dewatering papermaking furnishes having a random distribution of fibers so as to form a semi-solid web, and then belt creping the web so as to redistribute the fibers and shape the web in order to achieve paper products with desired properties.

These steps of papermaking processes can be conducted on papermaking machines having many different configurations. Two examples of such papermaking machines will now be described.

FIG. 1 shows a first example of a papermaking machine 200. The papermaking machine 200 is a three-fabric loop machine that includes a press section 100 in which a creping operation is conducted. Upstream of the press section 100 is a forming section 202, which, in the case of papermaking machine 200, is referred to in the art as a crescent former. The forming section 202 includes head box 204 that deposits a furnish on a forming wire 206 supported by rolls 208 and 210, thereby initially forming the papermaking web. The forming section 202 also includes a forming roll 212 that supports a papermaking felt 102 such that web 116 is also formed directly on the papermaking felt 102. The felt run 214 extends to a shoe press section 216 wherein the moist web is deposited on a backing roll 108, with the web 116 being wet-pressed concurrently with the transfer to the backing roll 108.

An example of an alternative to the configuration of papermaking machine 200 includes a twin-wire forming section, instead of the crescent forming section 202. In such a configuration, downstream of the twin-wire forming section, the rest of the components of such a papermaking machine may be configured and arranged in a similar manner to that of papermaking machine 200. An example of a papermaking machine with a twin-wire forming section can be seen in U.S. Pat. No. 8,293,072 B2, which is incorporated herein by reference in its entirety. Still further examples of alternative forming sections that can be used in a papermaking machine include a C-wrap twin wire former, an S-wrap twin wire former, or a suction breast roll former. Those skilled in the art will recognize how these, or even still further alternative forming sections, can be integrated into a papermaking machine.

The web 116 is transferred onto the creping belt 112 in a belt crepe nip 120, and then vacuum drawn by vacuum box 114, as will be described in more detail below. After this creping operation, the web 116 is deposited on Yankee dryer 218 in another press nip 224 using a creping adhesive. The transfer to the Yankee dryer 218 may occur, for example, with about 4% to about 40% pressurized contact area between the web 116 and the Yankee surface at a pressure of about 250 pounds per linear inch (PLI) to about 350 PLI (about 43.8 kN/meter to about 61.3 kN/meter). The transfer at nip 224 may occur at a web consistency, for example, from about 25% to about 70%. Note that "consistency," as used herein, refers to the percentage of solids of a nascent web, for example, calculated on a bone dry basis. At about 25% to about 70% consistency, it is sometimes difficult to adhere the web 116 to the surface of the Yankee dryer 218 firmly enough so as to thoroughly remove the web from the creping belt 112. In order to increase the adhesion between the web 116 and the surface of the Yankee dryer 218, an adhesive may be applied to the surface of the Yankee dryer 218. The adhesive can allow for high velocity operation of the system and high jet velocity impingement air drying, and also allow for subsequent peeling of the web 116 from the Yankee dryer 218. An example of such an adhesive is a poly(vinyl alcohol)/polyamide adhesive composition, with an example application rate of this adhesive being at a rate of less than about 40 mg/m$^2$ of sheet. Those skilled in the art, however, will recognize the wide variety of alternative adhesives, and further, quantities of adhesives, that may be used to facilitate the transfer of the web 116 to the Yankee dryer 218.

The web 116 is dried on Yankee dryer 218, which is a heated cylinder and by high jet velocity impingement air in the Yankee hood around the Yankee dryer 218. As the Yankee dryer 218 rotates, the web 116 is peeled from the Yankee dryer 218 at position 220. The web 116 may then be subsequently wound on a take-up reel (not shown). The reel may be operated faster than the Yankee dryer 218 at steady-state in order to impart a further crepe to the web 116. Optionally, a creping doctor blade 222 may be used to conventionally dry-crepe the web 116. In any event, a cleaning doctor may be mounted for intermittent engagement and used to control build up.

Figure 2:
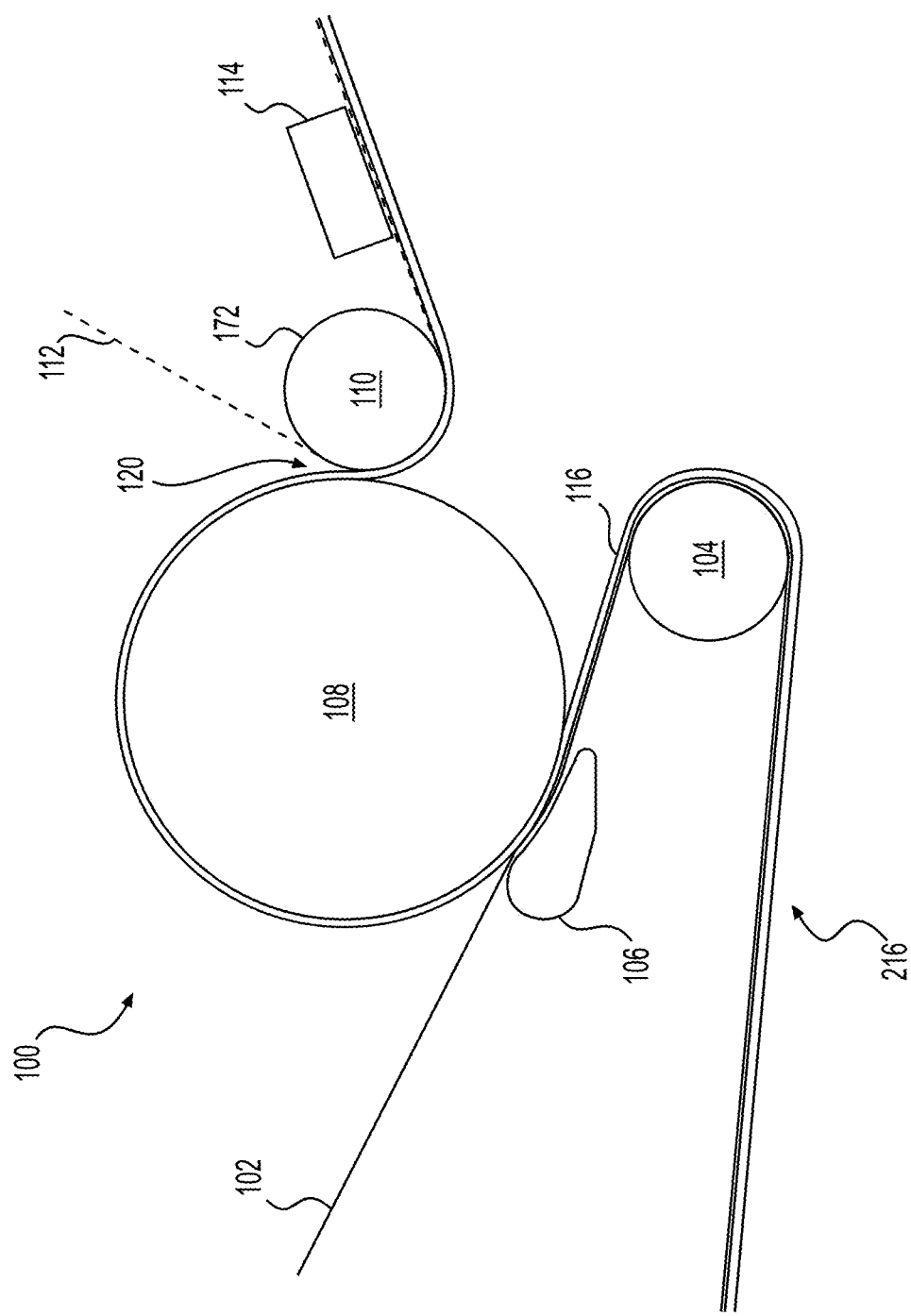
FIG. 2 is a schematic view illustrating the wet-press transfer and belt creping section of the papermaking machine shown in FIG. 1.

FIG. 2 shows details of the press section 100 where creping occurs. The press section 100 includes a papermaking felt 102, a suction roll 104, a press shoe 106, and a backing roll 108. The backing roll 108 may optionally be heated, for example, by steam. The press section 100 also includes a creping roll 110, the creping belt 112, and the vacuum box 114. The creping belt 112 may be configured with offset openings, as will described in detail below.

In a creping nip 120, the web 116 is transferred onto the top side of the creping belt 112. The creping nip 120 is defined between the backing roll 108 and the creping belt 112, with the creping belt 112 being pressed against the backing roll 108 by the surface 172 of the creping roll 110. In this transfer at the creping nip 120, the cellulosic fibers of the web 116 are repositioned and oriented, as will be described in detail below. After the web 116 is transferred onto the creping belt 112, a vacuum box 114 may be used to apply suction to the web 116 in order to at least partially draw out minute folds. The applied suction may also aid in drawing the web 116 into openings in the creping belt 112, thereby further shaping the web 116. Further details of this shaping of the web 116 will be described below.

The creping nip 120 generally extends over a belt creping nip distance or width of anywhere from, for example, about ⅛ in. to about 2 in. (about 3.18 mm to about 50.8 mm), more specifically, about 0.5 in. to about 2 in. (about 12.7 mm to about 50.8 mm). The nip pressure in creping nip 120 arises from the loading between creping roll 110 and backing roll 108. The creping pressure is, generally, from about 20 to about 100 PLI (about 3.5 kN/meter to about 17.5 kN/meter), more specifically, about 40 PLI to about 70 PLI (about 7 kN/meter to about 12.25 kN/meter). While a minimum pressure in the creping nip 120 of 10 PLI (1.75 kN/meter) or 20 PLI (3.5 kN/meter) is often necessary, one of skill in the art will appreciate that, in a commercial machine, the maximum pressure may be as high as possible, limited only by the particular machinery employed. Thus, pressures in excess of 100 PLI (17.5 kN/meter), 500 PLI (87.5 kN/meter), or 1000 PLI (175 kN/meter) or more may be used, if practical, and provided a velocity delta can be maintained.

In some embodiments, it may by desirable to restructure the interfiber characteristics of the web 116, while, in other cases, it may be desired to influence properties only in the plane of the web 116. The creping nip parameters can influence the distribution of fibers in the web 116 in a variety of directions, including inducing changes in the z-direction (i.e., the bulk of the web 116), as well as in the MD and CD. In any case, the transfer from the creping belt 112 is at high impact in that the creping belt 112 is traveling slower than the web 116 is traveling off of the backing roll 108, and a significant velocity change occurs. In this regard, the degree of creping is often referred to as the creping ratio, with the ratio being calculated as:

$$\text{Creping Ratio (\%)} = S_1/S_2 - 1$$

where $S_1$ is the speed of the backing roll 108 and $S_2$ is the speed of the creping belt 112. Typically, the web 116 is creped at a ratio of about 5% to about 60%. In fact, high degrees of crepe can be employed, approaching or even exceeding 100%.

Figure 3:
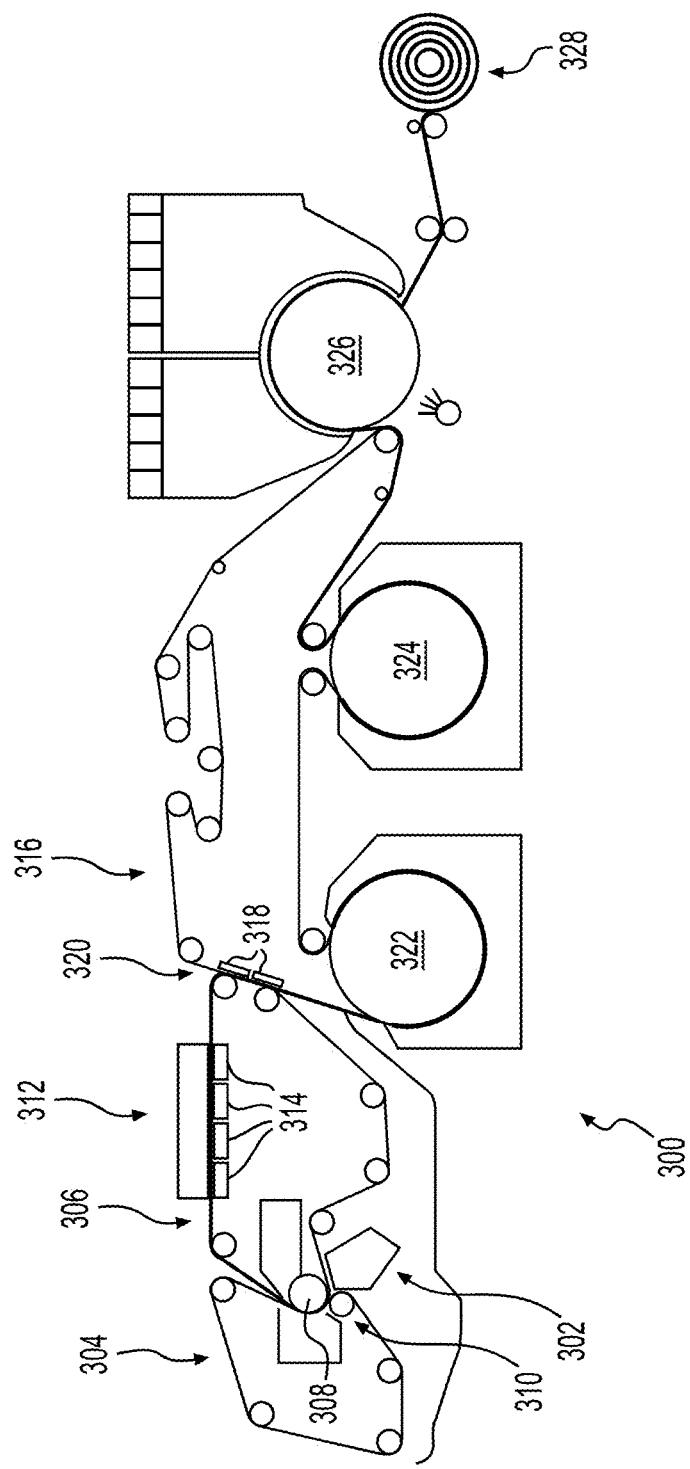
FIG. 3 is a schematic diagram of an alternative papermaking machine configuration that can be used in conjunction with the present invention.

FIG. 3 depicts an example of a papermaking machine 300 that can be used as an alternative to the papermaking machine depicted in FIG. 2. The papermaking machine 300 is configured for through-air drying (TAD), wherein water is substantially removed from the web by moving high temperature air though the web. As shown in FIG. 3, a furnish is initially supplied in papermaking machine 300 through head box 302. The furnish is directed in a jet into the nip formed between forming fabric 304 and transfer fabric 306 as they pass between a forming roll 308 and breast roll 310. The forming fabric 304 and transfer fabric 306 translate in continuous loops diverging after passing between forming roll 308 and breast roll 310. After separating from forming fabric 304, transfer fabric 306 passes through a dewatering zone 312 in which suction boxes 314 remove moisture from the web and transfer fabric 306, thereby increasing the consistency of the web from about 10 to about 25%. The web is then transferred to a through drying surface 316, which in embodiments of the present invention is a creping belt. In some embodiments, a vacuum is applied to assist in the transfer of the web to the belt 316, as indicated by the vacuum assist boxes 318 in the transfer zone 320.

The belt 316 carrying the web next passes around through dryers 322 and 324, with the consistency of the web thereby being increased from about 60% to about 90%. After passing through the dryers 322 and 324, the web is more or less permanently imparted with the creping structure. The web is then transferred to the Yankee cylinder 326 without a major degradation of its properties, with an adhesive sometimes being sprayed onto Yankee cylinder 326 just prior to contact with the translating web to facilitate the transfer. After the web reaches a consistency of about 96% or greater, a further creping is used to dislodge the web from Yankee cylinder 326 and taken up by a reel 328. The reel speed can be controlled relative to the speed of Yankee cylinder 326 to adjust the further crepe that is applied to the web as it is removed from the Yankee cylinder 326.

It should be noted that the papermaking machines depicted in FIGS. 1-3 are merely examples of the possible configurations that can be used with the invention described herein. Further examples include those described in the aforementioned U.S. Pat. No. 8,293,072 B2.

Creping Belts

Our invention is directed, in part, to a belt that can be used for the creping operations in papermaking machines such as those described above. As will be evident from the disclosure herein, the structure of the belt provides many advantageous characteristics that are particularly suited for creping operations. It should be noted, however, that inasmuch as the belt is structurally described herein, the belt structure could be used for applications other than creping operations, such as strictly a molding process that provides shapes to a papermaking web.

A creping belt according to embodiments of our invention can have a multilayer structure, as is described in U.S. Pat. No. 9,863,095 B2, which is incorporated herein by reference in its entirety. Such a multilayer creping belt according to the invention includes at least two layers. As used herein, a "layer" is a continuous, distinct part of the belt structure that is physically separated from another continuous, distinct layer in the belt structure. As will be discussed below, an example of two layers in a multilayer belt according to the invention is a polymeric layer that is bonded with an adhesive to the fabric layer.

Herein, the "top" or "sheet" or "Yankee" side of a multilayer creping belt refers to the side of the belt on which the web is deposited for the creping operation. Hence, the "top layer" is the portion of the multilayer belt that forms the surface onto which the cellulosic web is shaped in the creping operation. The "bottom" or "air" ("machine") side of the creping belt, as used herein, refers to the opposite side of the belt, i.e., the side that faces and contacts the processing equipment such as the creping roll and the vacuum box. And, accordingly, the "bottom layer" provides the bottom (air) side surface.

It should be noted that although two layer belts are described in detail herein, creping belts according to embodiments of our invention could alternatively be made using a single layer belt. Indeed, those skilled in the art will recognize, for example, different materials for constructing a single layer belt in which the opening patterns described herein are formed.

Top Layer of Multilayer Creping Belt

One of the functions of the top layer of a multilayer belt according to the invention is to provide a structure into which openings can be formed, with the openings passing through the layer from one side of the layer to the other, and with the openings imparting dome shapes to the web in a papermaking process. The top layer does not need to impart any strength and durability to the belt structure, per se, as these properties will be provided primarily by the bottom layer, as described below. Further, the openings in the top layer need not be configured to prevent fibers from being pulled through the top layer in the papermaking process, as this will also be achieved by the bottom layer, as will also be described below. As will be described below, in embodiments of our invention the openings in the top layer of the multilayer creping belts are arrangement in patterns wherein the openings are offset in the MD and CD of the belts.

In some embodiments of the invention, the top layer of our multilayer belt is made from an extruded flexible thermoplastic material. In this regard, there is no particular limitation on the types of thermoplastic materials that can be used to form the top layer, as long as the material generally imparts the properties such as friction (e.g., between the paper forming web and the belt), compressibility, and tensile strength for the top layer described herein. And, as will be apparent to those skilled in the art from the disclosure herein, there are numerous possible flexible thermoplastic materials that can be used that will provide substantially similar properties to the thermoplastics specifically discussed herein. It should also be noted that the term "thermoplastic material" as used herein is intended to include thermoplastic elastomers, e.g., rubber materials. It should be further noted that the thermoplastic material could include either thermoplastic materials in fiber form (e.g., chopped polyester fiber) or non-plastic additives, such as those found in composite materials.

A thermoplastic top layer can be made by any suitable technique, for example, molding, extruding, thermoforming, etc. Notably, the thermoplastic top layer can be made from a plurality of sections that are joined together, for example, side to side in a spiral fashion as described in U.S. Pat. No. 8,394,239 B2, the disclosure of which is incorporated by reference in its entirety. Moreover, the thermoplastic top layer can be made to any particular required length, and can be tailored to the path length required for any specific papermaking machine configuration.

In specific embodiments, the material used to form the top layer of the multilayer belt is polyurethane. As an alternative to polyurethane, an example of a specific thermoplastic that may be used to form the top layer in other embodiments of the invention is sold under the name HYTREL® by E. I. du Pont de Nemours and Company of Wilmington, Del. HYTREL® is a polyester thermoplastic elastomer with the friction, compressibility, and tensile properties conducive to forming the top layer of the multilayer creping belt described herein.

Thermoplastics, such as the polyurethanes described above, are advantageous materials for forming the top layer of the inventive multilayer belt when considering the ability to form openings of different sizes and configurations in thermoplastics. Openings in the thermoplastic used to form the top layer may be easily formed using a variety of techniques. Examples of such techniques include laser engraving, drilling, cutting or mechanical punching. As will be appreciated by those skilled in the art, such techniques can be used to form large and consistently-sized openings. In fact, openings of most any configuration (dimensions, shape, sidewall angle, etc.) can be formed in a thermoplastic top layer using such techniques.

When considering the different configurations of the openings that can be formed in the top layer, it is important to note that the openings need not be identical. That is, some of the openings formed in the top layer can have different configurations from other openings that are formed in the top layer. In fact, different openings could be provided in the top layer in order to provide different functions in the papermaking process. For example, some of the openings in the top layer could be sized and shaped to provide for forming dome structures in the papermaking web during the creping operation (described in detail below). At the same time, other openings in the top layer could be of a much greater size and a varying shape so as to provide patterns in the papermaking web that are equivalent to patterns that are achieved with an embossing operation. However, the patterns are achieved without the undesirable effects of embossing, such as loss in sheet bulk and other desired properties.

When considering the material for use in forming the top layer of the inventive multilayer belt, polyurethane is a well-suited material, as discussed above. Polyurethane is a relatively soft material for use in a creping belt, especially, when compared to materials that could be used to form a monolithic creping belt. At the same time, polyurethane can provide a relatively-high friction surface. Polyurethane is known to have a coefficient of friction ranging from about 0.5 to about 2 depending on its formulation. In embodiments of our invention, the polyurethane top surface of the multilayer belt has a coefficient of friction of about 0.6. Notably, the HYTREL® thermoplastic, also discussed above as being a well-suited material for forming the top layer, has a coefficient of friction of about 0.5. Thus, the inventive multilayer belt can provide a soft and high-friction top surface, effecting a "soft" sheet creping operation.

The friction of the top surface of the top layer, as well as other surface phenomena of the top surface, can be changed through the application of coatings on the top surface. In this regard, a coating can be added to the top surface to increase or to decrease the friction of the top surface. Additionally, or alternatively, a coating can be added to the top surface to change the release properties of the top surface. Examples of such coatings include both hydrophobic and hydrophilic compositions, depending on the specific papermaking processes in which the multilayer creping belt is to be used. These coatings can be sprayed onto the belt during a papermaking process, or the coatings can be formed as a permanent coating attached to the top surface of the multilayer belt.

Bottom Layer

The bottom layer of the multilayer creping belt functions to provide strength, MD stretch and creep resistance, CD stability, and durability to the belt. As discussed above, a flexible polymeric material, such as polyurethane, provides an attractive option for the top layer of the belt. Polyurethane, however, is a relatively weak material that, by itself, will not provide the desirable properties to the belt. A homogeneous monolithic polyurethane belt would not be able to withstand the stresses and strains imparted to the belt during a papermaking process. By joining a polyurethane top layer with a second layer, however, the second layer can provide the required strength, stretch resistance, etc., to the belt. In essence, the use of a distinct bottom layer, separate from the top layer, expands the potential range of materials that can be used for the top layer.

As with the top layer, the bottom layer also includes a plurality of openings through the thickness of the layer. Each opening in the bottom layer is aligned with at least one opening in the top layer, and thus, openings are provided through the thickness of the multilayer belt, i.e., through the top and bottom layers. The openings in the bottom layer, however, are smaller than the openings in the top layer. That is, the openings in the bottom layer have a smaller cross-sectional area adjacent to the interface between the top layer and the bottom layer than the cross-sectional area of the plurality of openings of the top layer adjacent to the interface between the top and bottom layers. The openings in the bottom layer, therefore, can prevent cellulosic fibers from being pulled completely through the multilayer belt structure, for example, when the belt and papermaking web are exposed to a vacuum. As generally discussed above, fibers that are pulled through the belt are detrimental to a papermaking process in that the fibers build up in the papermaking machine over time, e.g., accumulating on the outside rim of the vacuum box. The buildup of fibers necessitates machine down time in order to clean out the fiber buildup. The openings in the bottom layer, therefore, can be configured to substantially prevent fibers from being pulled through the belt. However, because the bottom layer does not provide the creping surface, and thus, does not act to shape the web during the creping operation, configuring the openings in the bottom layer to prevent fiber pull through does not substantially affect the creping operation of the belt.

In some embodiments of the invention, a woven fabric is provided as the bottom layer of the multilayer creping belt. As discussed above, woven structuring fabrics have the strength and durability to withstand the forces of a creping operation. And, as such, woven structuring fabrics have been used, by themselves, as creping structures in papermaking processes. A woven structuring fabric, therefore, can provide the necessary strength, durability, and other properties for the multilayer creping belt according to the invention.

In specific embodiments of the multilayer creping belt, the woven fabric provided for the bottom layer has similar characteristics to woven structuring fabrics used by themselves as creping structures. Such fabrics have a woven structure that, in effect, has a plurality of "openings" formed between the yarns making up the fabric structure. In this regard, the result of the openings in a fabric may be quantified as an air permeability that allows airflow through the fabric. In terms of our invention, the permeability of the fabric, in conjunction with the openings in the top layer, allows air to be drawn through the belt. Such airflow can be drawn through the belt at a vacuum box in the papermaking machine, as described above. Another aspect of the woven fabric layer is the ability to prevent fibers from being pulled completely through the multilayer belt at the vacuum box. In general, it is preferable that less than one percent of the fibers should pass completely through the creping belt or fabric during a papermaking process.

As an alternative to a woven fabric, in other embodiments of the invention, the bottom layer of the multilayer creping belt can be formed from an extruded thermoplastic material. Unlike the flexible thermoplastic materials used to form the top layer discussed above, however, the thermoplastic material used to form the bottom layer is provided in order to impart strength, stretch resistance, durability, etc., to the multilayer creping belt. Examples of thermoplastic materials that can be used to form the bottom layer include polyesters, copolyesters, polyamides, and copolyamides. Specific examples of polyesters, copolyesters, polyamides, and copolyamides that can be used to form the bottom layer can be found in the aforementioned U.S. Pat. No. 8,394,239 B2.

In specific embodiments of the invention, PET may be used to form the extruded bottom layer of the multilayer belt. PET is a well-known durable and flexible polyester. In other embodiments, HYTREL® (which is discussed above) may be used to form the extruded bottom layer of the multilayer belt. Those skilled in the art will recognize similar alternative materials that could be used to form the bottom layer.

When using an extruded polymeric material for the bottom layer, openings may be provided through the polymeric material in the same manner as the openings are provided in the top layer, e.g., by laser drilling, cutting, or mechanical perforation. At least some of the openings in the bottom layer are aligned with the openings in the top layer, thereby allowing for air flow through the multilayer belt structure in the same manner that a woven fabric bottom layer allows for air flow through the multilayer belt structure. The openings in the bottom layer need not, however, be the same size as the openings in the top layer. In fact, in order to reduce fiber pull-through in a manner analogous to a fabric bottom layer, the openings in the extruded polymeric bottom layer may be substantially smaller than the openings in the top layer. In general, the size of the openings in the bottom layer can be adjusted to allow for certain amounts of air flow through the belt. Moreover, multiple openings in the bottom layer may be aligned with an opening in the top layer. A greater air flow can be drawn through the belt at a vacuum box if multiple openings are provided in the bottom layer, so as to provide a greater total opening area in the bottom layer relative to the opening area in the top layer. At the same time, the use of multiple openings with a smaller cross-sectional area reduces the amount of fiber pull-through relative to a single, larger, opening in the bottom layer. In a specific embodiment of the invention, the openings in the second layer have a maximum cross-sectional area of 350 square microns adjacent to the interface with the first layer.

There are other materials that may be used to form the bottom layer in alternatives to the woven fabric and extruded polymeric layer described above. For example, in an embodiment of the invention, the bottom layer may be formed from metallic materials, and in particular, a metallic screen-like structure. The metallic screen provides the strength and flexibility properties to the multilayer belt in the same manner as the woven fabric and extruded polymeric layer described above. Further, the metallic screen functions to prevent cellulose fibers from being pulled through the belt structure, in the same manner as the woven fabric and extruded polymeric materials described above. A still further alternative material that could be used to form the bottom layer is a super-strong fiber material, such as a material formed from para-aramid synthetic fibers. Super-strong fibers may differ from the fabrics described above by not being woven together, but yet still be capable of forming a strong and flexible bottom layer. Those skilled in the art will recognize still further alternative materials that are capable of providing the properties of the bottom layer of the multilayer belt described herein.

Multilayer Structure

The multilayer belt according to the invention is formed by connecting the above-described top and bottom layers. As will be understood from the disclosure herein, the connection between the layers can be achieved using a variety of different techniques, some of which will be described more fully below.

Figure 4A:
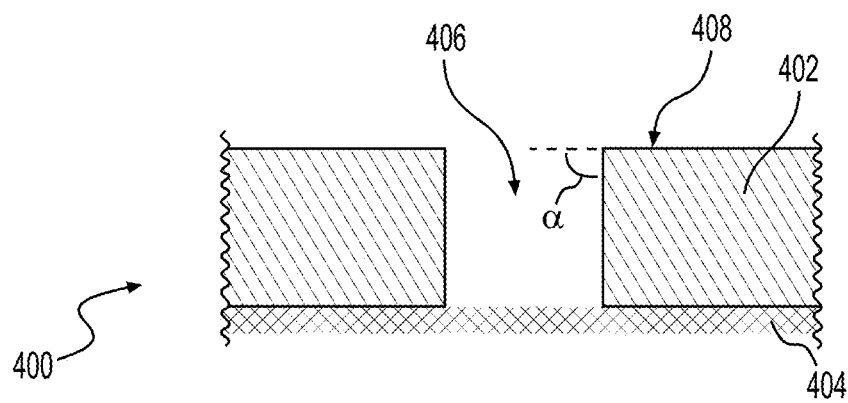
FIG. 4A is a cross-sectional view of a portion of a creping belt according to an embodiment of the invention.

FIG. 4A is a cross-sectional view of a portion of a multilayer creping belt 400 according to an embodiment of the invention. The belt 400 includes a polymeric top layer 402 and a fabric bottom layer 404. The polymeric top layer 402 provides the top surface 408 of the belt 400 on which the web is creped during the creping operation of the papermaking process. An opening 406 is formed in the polymeric top layer 402, as described above. Note that the opening 406 extends through the thickness of the polymeric top layer 402 from the top surface 408 to the surface facing the fabric bottom layer 404. As the woven fabric bottom layer 404 has a certain permeability, a vacuum can be applied to the woven fabric bottom layer 404 side of the belt 400, and thus, draw an airflow through the opening 406 and the woven fabric bottom layer 404. During the creping operation using the belt 400, cellulosic fibers from the web are drawn into the opening 406 in the polymeric top layer 402, which will result in a dome structure being formed in the web (as will be described more fully below). A vacuum may additionally be used to draw the web into the opening 406.

Figure 4B:
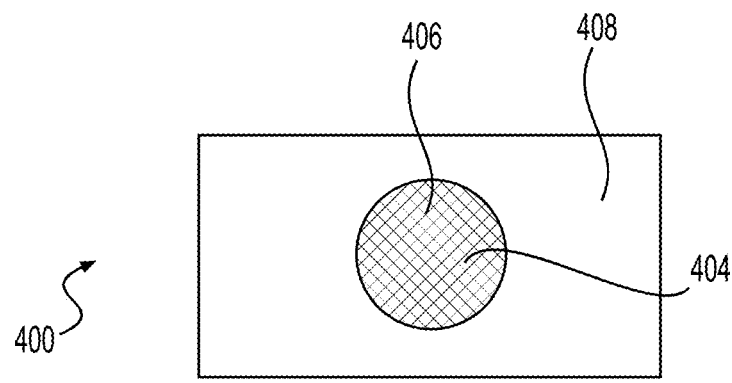
FIG. 4B is a top view of the portion of shown in FIG. 4A.

FIG. 4B is a top view of the belt 400 looking down on the portion with the opening 406 shown in FIG. 4A. As is evident from FIGS. 4A and 4B, while the woven fabric bottom layer 404 allows the vacuum to be drawn through the belt 400, the woven fabric bottom layer 404 also effectively closes off the opening 406 in the top layer. That is, the woven fabric bottom layer 404 in effect provides a plurality of openings that have a smaller cross-sectional area adjacent to the interface between the extruded polymeric top layer 402 and the woven fabric bottom layer 404. Thus, the woven fabric bottom layer 404 can substantially prevent cellulosic fibers from passing through the belt 400. As described above, the woven fabric bottom layer 404 also imparts strength, durability, and stability to the belt 400.

Figure 5A:
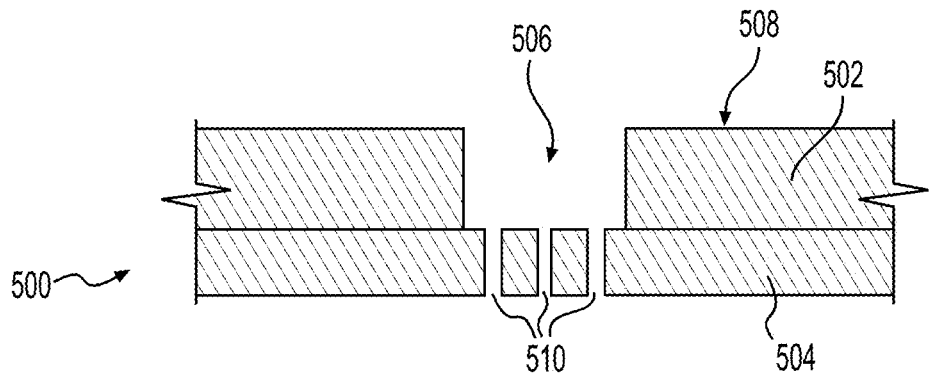
FIG. 5A is a cross-sectional view of a portion of a multilayer creping belt according to another embodiment of the invention.
Figure 5B:
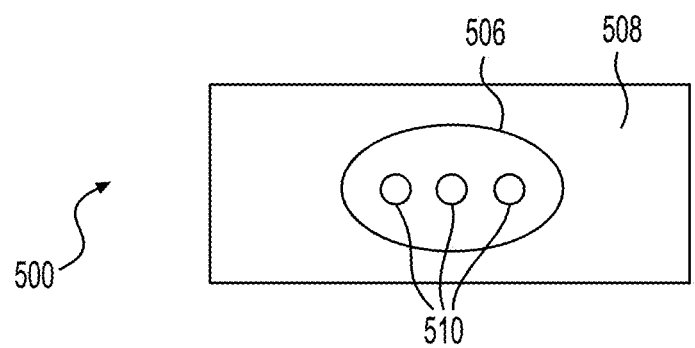
FIG. 5B is a top view of the portion of shown in FIG. 5A.

FIG. 5A is a cross-sectional view of a portion of a multilayer creping belt 500 according to an embodiment of the invention that includes an extruded polymeric top layer 502 and an extruded polymeric bottom layer 504. The polymeric top layer 502 provides the top surface 508 on which a papermaking web is creped. In this embodiment, the opening 506 in the top layer 502 is aligned with three openings 510 in the bottom layer. As is evident from the top-view of the belt portion 500 shown in FIG. 5B (with reference to FIG. 5A), the openings 510 in the polymeric bottom layer 504 have a substantially smaller cross section than the opening 506 in the polymeric top layer 502. That is, the polymeric bottom layer 504 includes a plurality of openings 510 having a smaller cross-sectional area adjacent to the interface between the polymeric top layer 502 and the polymeric bottom layer 504. This allows the extruded polymeric bottom layer 504 to function to substantially prevent fibers from being pulled through the belt structure, in the same manner as a woven fabric bottom layer described above. It should be noted, that, as indicated above, in alternative embodiments, a single opening in the extruded polymeric bottom layer 504 may be aligned with the opening 506 in the extruded polymeric top layer 502. In fact, any number of openings may be formed in the polymeric bottom layer 504 for each opening in the polymeric top layer 502.

The openings 406, 506, and 510 in the extruded polymeric layers in the belts 400 and 500 are such that the walls of the openings 406, 506, and 510 extend orthogonal to the surfaces of the belts 400 and 500. In other embodiments, however, the walls of the openings 406, 506, and 510 may be provided at different angles relative to the surfaces of the belts. The angle of the openings 406, 506, and 510 can be selected and made when the openings are formed by techniques such as laser drilling, cutting, or mechanical perforation.

The layers of the multilayer belt according to the invention may be joined together in any manner that provides a durable enough connection between the layers to allow the multilayer creping belt to be used in a papermaking process. In some embodiments, the layers are joined together by a chemical means, such as using an adhesive. A specific example of an adhesive structure that could be used to join the layers is a double coated tape. In other embodiments, the layers may be joined together by a mechanical means, such as using a hook-and-loop fastener. In still other embodiments, the layers of the multilayer belt may be joined by techniques such as heat welding and laser fusion. Those skilled in the art will appreciate the numerous lamination techniques that could be used to join the layers described herein to form the multilayer belt.

While the multilayer belt embodiments depicted in FIGS. 4A, 4B, 5A, and 5B includes two distinct layers, in other embodiments, an additional layer may be provided between the top and bottom layers shown in the figures. For example, an additional layer could be positioned between the top and bottom layers described above in order to provide a further barrier that, while allowing air to pass through the belt, prevents fibers from being pulled through the belt structure. In other embodiments, the means employed for connecting the top and bottom layers together may be constructed as a further layer. For example, an adhesive layer might be a third layer that is provided between the top layer and the bottom layer.

Openings in Creping Belts

We have found that specific alignments of openings formed in the top surface/layer of a creping belt produce paper products with outstanding properties, while, at the same time, providing for better transfer of the web onto the creping belt in the papermaking process. In particular, we have found that lines of openings that are arranged along lines that are offset from both the MD direction and the CD direction provide for both excellent paper products and sheet transfer. Specific examples of paper products and processes for making the paper products will be discussed below.

Figure 6:
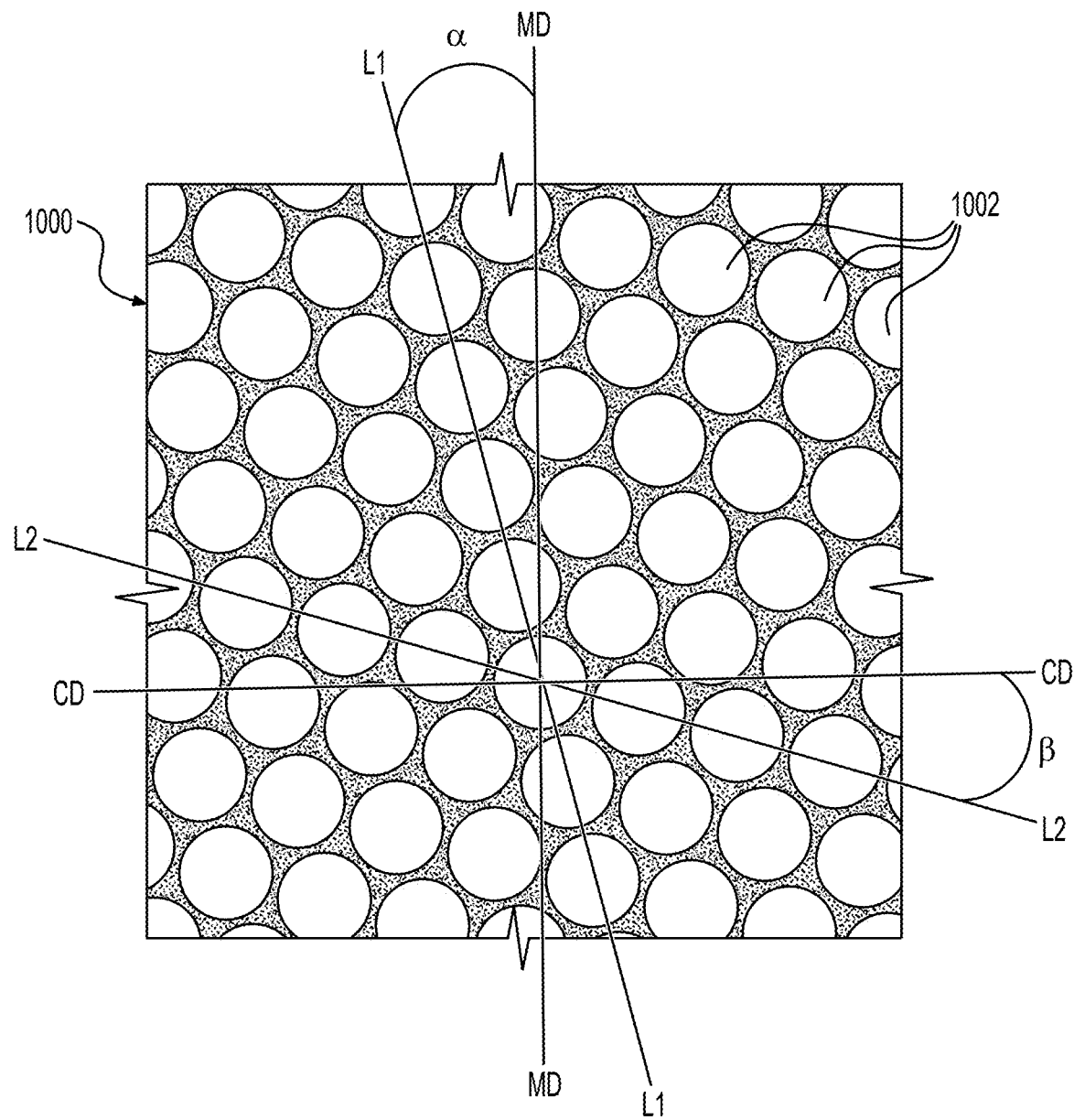
FIG. 6 is schematic diagram showing a pattern of offset openings for a creping belt according to an embodiment of the invention.

An example of a creping belt 1000 having offset lines of openings 1002 in its top surface is shown in FIG. 6 (only some of the openings 1002 are specifically denoted with reference lines in the figure). In the belt 1000, the openings 1002 are arranged along lines that are offset by an angle α from a line along the MD direction. One such line of openings 1002 is denoted L1 in FIG. 6. The openings 1002 are also arranged along lines that are offset by an angle β from a line along the CD direction, with one such line being denoted L2 in FIG. 6.

In specific embodiments of our invention, the lines of openings are set at an angle of about 12 to about 21 degrees relative to a line along the MD direction. In this regard, it should be noted that the line of offset openings can be rotated in a counterclockwise direction relative to the MD line, as in the case of the belt shown in FIG. 6, or the line of offset openings can be rotated in a clockwise direction, as in the belts shown in FIG. 7 (which is discussed more fully below).

The openings can have different cross-sectional shapes, including non-circular shapes. But, when the openings do have a circular cross section on the top surface of the belt, in embodiments of our invention the openings can have diameters from about 0.5 mm to about 5.0 mm, and, thus, the openings can have cross-sectional areas of about 0.785 mm$^2$ to about 7.85 mm$^2$. In more specific embodiments, the openings can have diameters from about 0.75 mm to about 2.5 mm, and, thus, the openings can have cross-sectional areas of about 1.75 mm$^2$ to about 2.0 mm$^2$. In conjunction with the size of the openings, the percentage of the open area on the top surface resulting from the openings can range from about 10% to about 90%. In other words, the percentage of the top surface of the belt forming the contact area (i.e., the area other than the openings) ranges from about 10% to about 90%. Specific parameters of embodiments of belts with offset lines of circular openings are shown in FIG. 7. All of the belts shown in FIG. 7 have a multilayer structure as described above, with the openings being formed in the top layer of the belt.

While not being bound by theory, we believe that excellent paper products can be made using creping belts having offset lines of openings due to the configuration of the contact area that the belts provide in the creping nip of a papermaking machine. As discussed above, in the creping nip the papermaking web is transferred onto the top of the belt. Generally speaking, the transfer of the web to a creping belt is a difficult operation, as the web is unstable due to its high moisture content at this point in the papermaking process. We believe that with the offset lines of openings, the creping belt provides a contact area that is more conducive to the web transfer as compared to belts having other arrangements of openings. Specifically, the offset lines of openings provide a contact area having a balance of MD-like and CD-like components. That is, the offset in the lines of openings provides for a contact area that is more CD-like in the creping nip as compared to alignments having lines of openings that extend along lines in the MD. This CD-like nature of the contact area of the creping belts enable the belts to better take hold of webs that are moving in the MD through the creping nip. At the same time, the belt's contact area is still sufficiently MD-like to avoid undesirable effects that can arise with too much of a CD-like contact area, such as reduced softness in the paper products. Still further, the contact area resulting from an alignment with offset lines of openings may also provide beneficial reorientation of cellulose fibers of the web, as will be evidenced by the paper products made in the trials discussed below.

To see the effects of the offset alignment of openings in creping belts according to embodiments of our invention, a finite element analysis (FEA) model of the transfer of a web onto a creping belt was created using Abacus software made by Dassault Systemes SE of Vélizy-Villacoublay, France. As will be appreciated by those skilled in the art, such an FEA model uses components of a dynamic system by associating the geometry defining each component with the appropriate material models and specifying component interactions. The software automatically chooses appropriate load increments and convergence tolerances and continually adjusts them during the analysis to ensure that an accurate solution is obtained. In this case, the creping belt geometry, creping nip parameters, and web consistency were taken into account to create the model of the web transfer.

Figure 8:
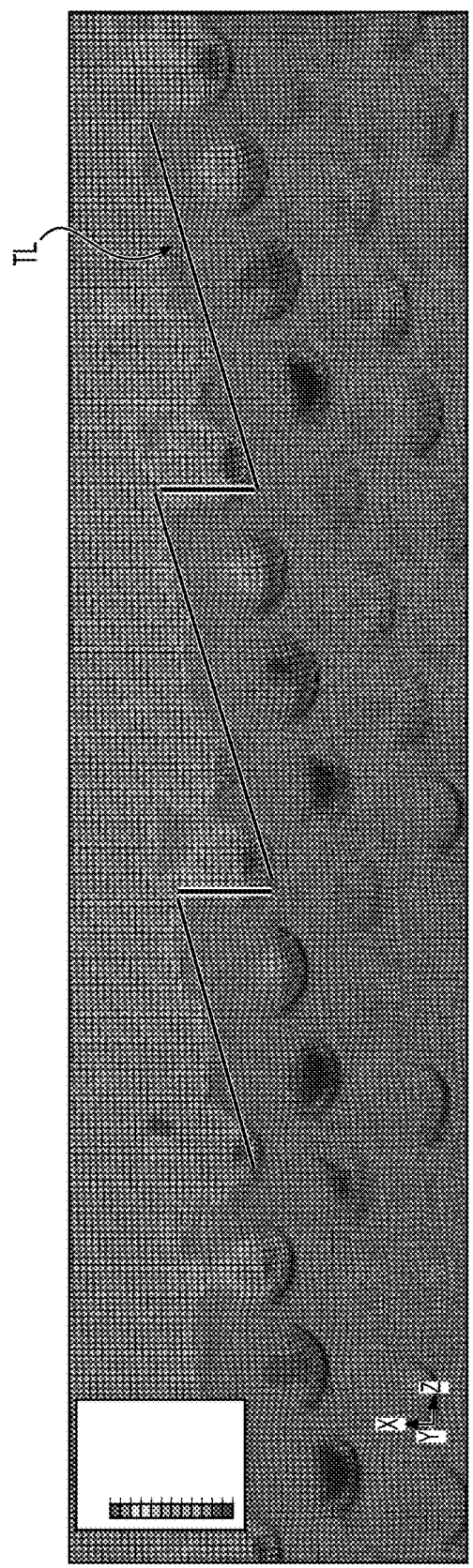
FIG. 8 is a model showing the transfer of a papermaking web to a creping belt according to an embodiment of the invention.
Figure 9:
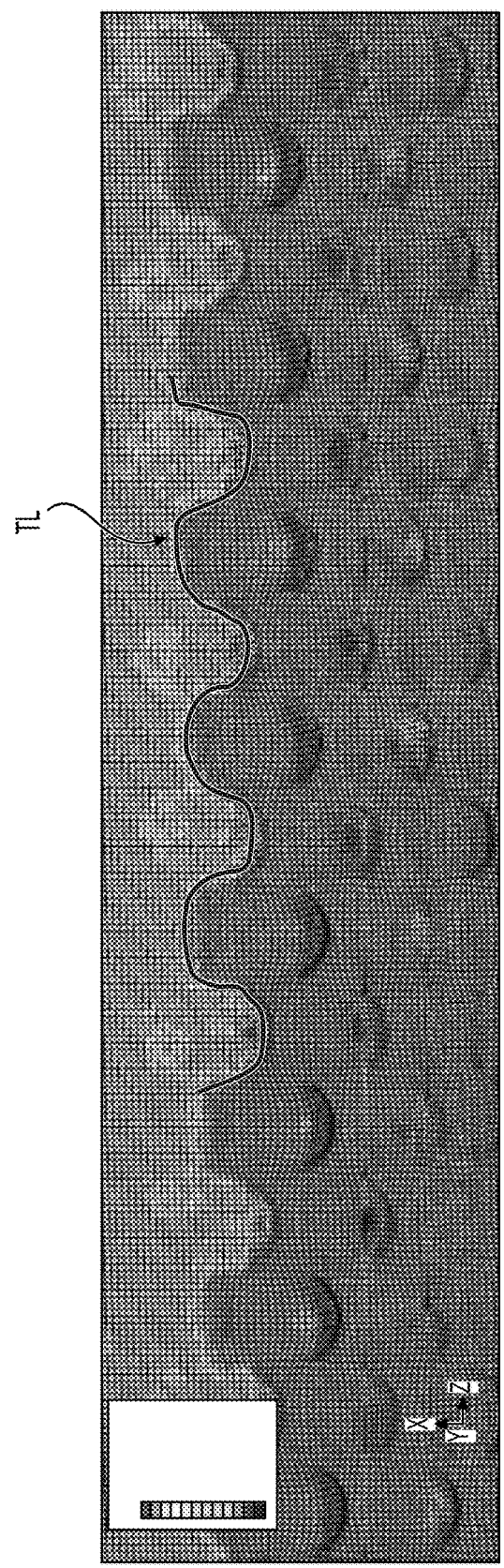
FIG. 9 is a model showing the transfer of a papermaking web to a comparison creping belt.

FIGS. 8 and 9 show the output of such a model for the transfer of a web onto two different belts. FIG. 8 shows the case of a creping belt having offset lines of openings, as described herein. For comparison, FIG. 9 shows the case of a belt having openings that are arranged along lines that extend along the MD and CD. In these figures, the MD is in the vertical direction and the CD is in the horizontal direction. Thus, the webs are modeled as moving downwards in the figures, with the upper parts of the figures representing the webs before they are transferred onto the creping belts, the lower parts of the figures representing the webs after they are transferred onto the creping belts, and the middle sections of the figures being areas where the webs first contact the belts. In the figures, the coloring represents the velocity of the web at each point, with the lighter colors (e.g., orange) representing a higher velocity and the darker colors (green and blue) representing a lower velocity. References lines TL have been added to the figures to denote the sharp change in velocity indicating that the webs are first beginning to contact the belts.

As is evident from the models shown in FIGS. 8 and 9, there is a remarkable difference between sheet transfer onto the belt with offset lines of openings as compared to sheet transfer onto the belt with openings aligned in the MD and CD. With the belt having offset lines of openings (FIG. 8), the line TL at which the web first contacts the creping belt extends substantially in the CD direction across a plurality of openings in the MD before substantially extending in the MD. On the other hand, the line TL at which the web first contacts the creping belt with MD and CD aligned openings (FIG. 9) extends in a sinusoidal manner across the openings. Another difference that can be seen in models of the belts shown in FIGS. 8 and 9 is how the webs decelerate within the openings. There is a very non-uniform deceleration of the web into the openings in the belt with offset openings shown in FIG. 8, in that the web moving into the openings slows down dramatically in the area soon after the web first contacts the belt. In comparison, deceleration of the web into the openings is very uniform in the aligned openings of the belt with aligned openings shown in FIG. 9. We believe that the sweeping-like transfer line shown by the model with the belt having offset lines of openings is better. And, a better transfer leads to improvements in many aspects of the papermaking process, including consistency in the products produced in the process.

Figure 10:
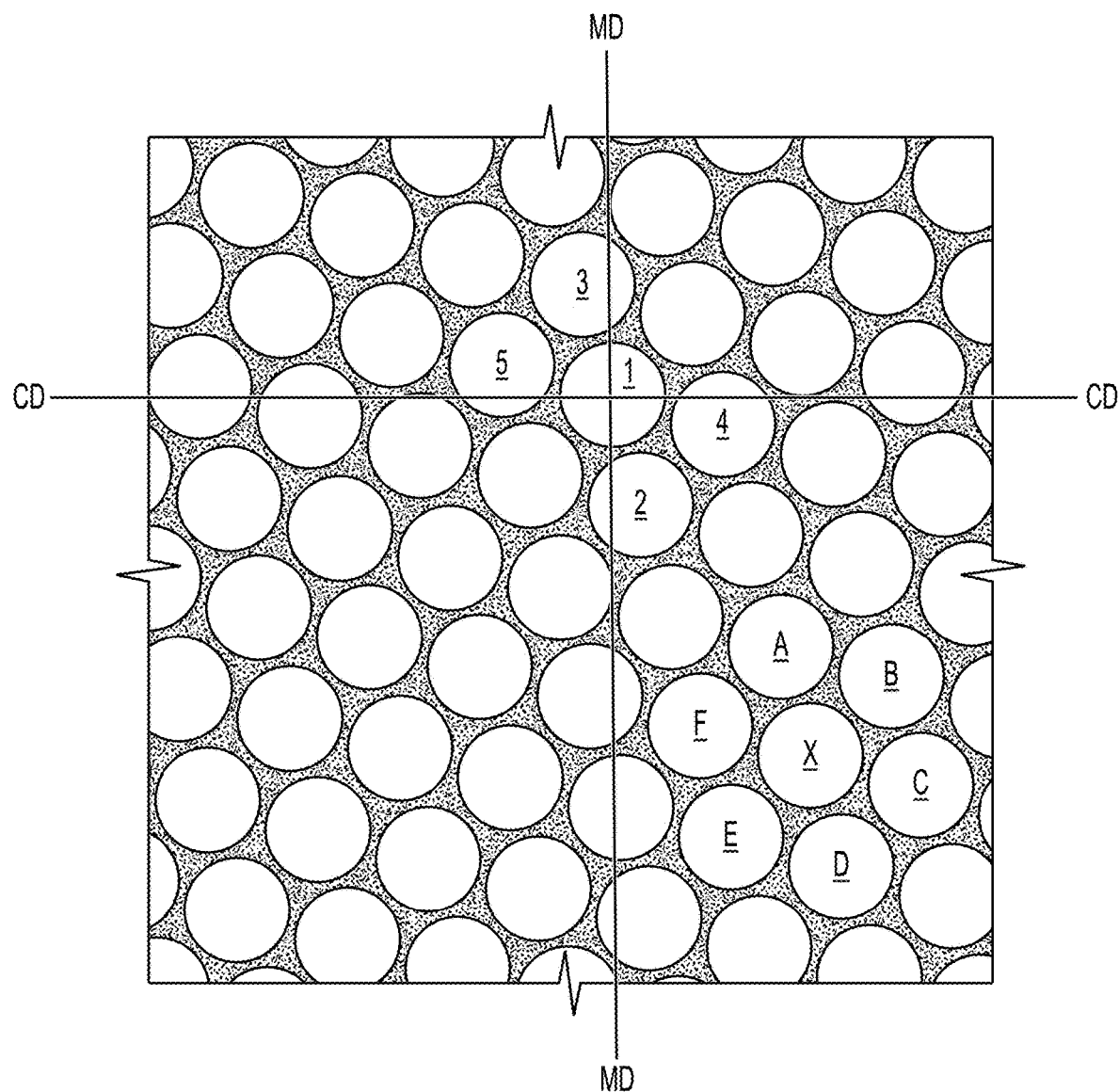
FIG. 10 is a schematic diagram showing properties of the opening in a creping belt according to an embodiment of the invention.

The openings in the example belts shown in FIGS. 6, 7, and 10 are arranged in repeating patterns that have six openings positioned around one opening. For example, in FIG. 10, a center opening of one hexagonal pattern is denoted as X, with six openings A-F surrounding the center opening X. Those skilled in the art will recognize that it is possible to have other patterns of openings that are different than the depicted hexagonal patterns, but still result in the openings being arranged along lines that are offset from lines in the MD and CD directions. Moreover, such other patterns will have at least some of the same aspects of the belts and resultant paper properties described herein. Thus, our invention should not be construed as limited to the patterns of openings depicted herein.

One aspect of creping belts according to embodiments of our invention that stems from the offset lines of the openings can be seen in FIG. 10. For every line along the MD, a length of the line across an opening is different from lengths of the line across the adjacent openings on both sides of the opening. For example, the line MD runs across the diameter of the opening 1 in FIG. 10. The length of the line MD across that diameter is different than the length of the line MD across the openings 2 and 3 that are adjacent to the opening 1. The offset configuration in the CD also provides a similar relation between adjacent openings. For example, the line CD extends across the diameter of the opening 1 in the CD, and the length of line CD along that diameter is different than the lengths of the line CD across the adjacent openings 4 and 5.

Another aspect of offset openings in creping belts according to embodiments of our invention is related to the rotational symmetry in the patterns of openings. As will be appreciated by those skilled in the art, rotational symmetry refers to the number of degrees that an object can be rotated and then appear the same. As shown in FIG. 10, even with the offset in the openings, each hexagonal pattern of openings has a rotational symmetry of 60°. For example, if the hexagonal pattern with the center opening marked X is rotated 60° such that opening A is moved to the position of opening B in the figure, then the pattern would appear the same as before the rotation. Note as well that the hexagonal patterns have an order of symmetry of six in that there are six rotational positions that the pattern may be moved to and still the resulting patter would appear the same.

Yet another aspect of offset openings in creping belts according to embodiments of our invention is related to the lack of a mirror image about the patterns. For example, when considering the hexagonal pattern in FIG. 10 with opening 1 in the center of the pattern, it can be seen that pattern is not mirror-imaged about either the MD line or the CD line. This is also true of all of the other patterns shown in the figure, and is a result of the offset of the openings in the MD and CD directions. It should also be noted that the offset openings provide for combinations of properties, for example, there can be a rotational symmetry in the patterns of openings, but no mirror image about MD and CD lines in the patterns of openings.

As discussed above, the area of the top surface of the belt that the web first contacts during the transfer operation can be important in that operation. An aspect of our invention related to this contact area can be seen by evaluating how the amount of contact area changes along MD lines in the belts. An MD line contact profile sum is a summation of the total contact area as taken along an MD line in the belt. By determining MD line contact profile sums through different arrangement of openings in different belts, the MD line contact profile sums may be used to quantify differences in belts stemming from the arrangement of the openings.

Figure 11:
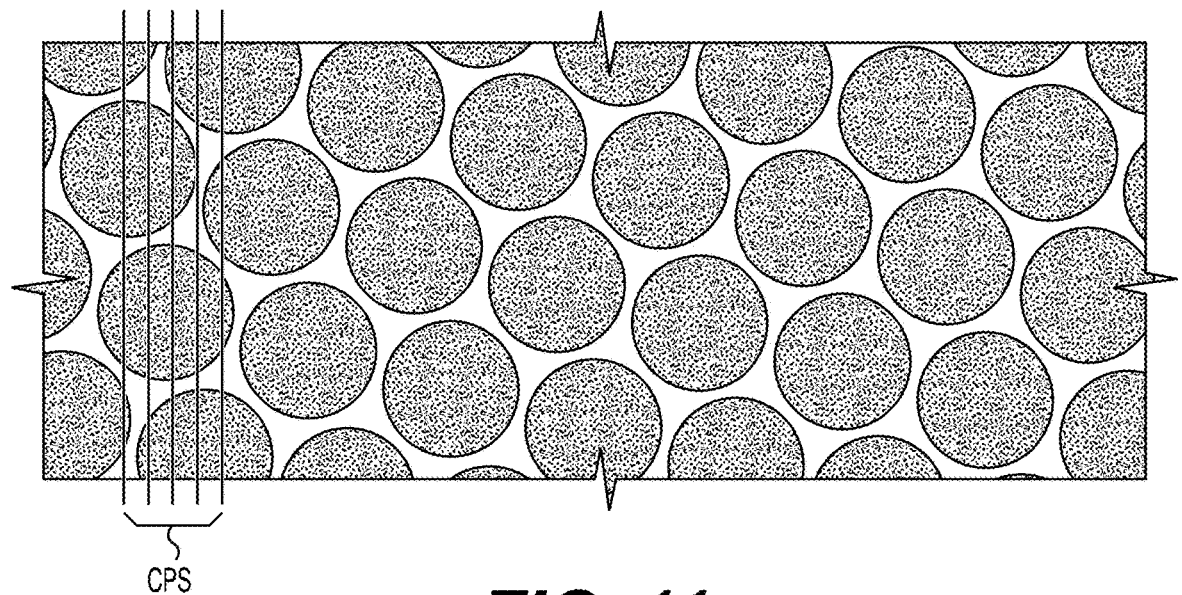
FIG. 11 is a model representation of openings in a creping belt according to an embodiment of the invention.

MD line contact profile sums can be determined by using a model representation of the openings of a belt. FIG. 11 shows an example of such model representation for an arrangement of openings in a creping belt. In FIG. 11, the contact profile sums are calculated along the lines labeled CPS. As will be recognized by those skilled in the art, the model representation shown in FIG. 11 can be created with a graphical program by specifying the size of the openings and the relation of openings relative to each other (e.g., distance between the centers of the openings and the angles formed between the centers of the openings). An example of such a graphical program is Adobe Illustrator by Adobe Systems of San Jose, Calif. With a model representation as shown in FIG. 11, the MD line contact profile sums may be easily calculated, for example, by having the graphical program calculate the contact area along the MD lines based on the white pixels in the model along lines CPS as moving across the CD direction of the model.

Figure 12:
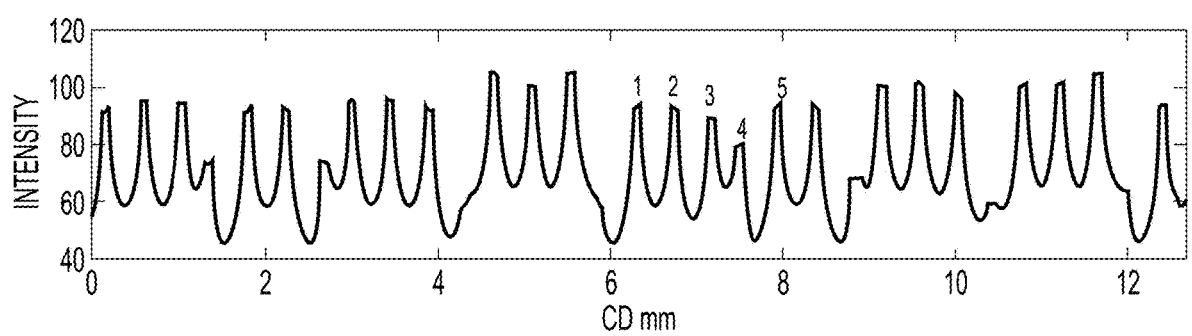
FIG. 12 shows the MD line contact profile sums for the belt representation shown in FIG. 11.

FIG. 12 shows the MD line contact profile sums for the belt representation shown in FIG. 11. In FIG. 12, the X-axis is the position of an MD line along the CD direction, and the "intensity" of the Y-axis is the total sum contact area (white pixels) for MD lines. Hence, the peaks in intensity represent MD lines with the most total contact area, whereas the troughs represent MD lines with the lowest total contact area.

It is notable that in the case of the opening pattern of the creping belt shown in FIG. 11, the MD line contact profile sums have peaks at substantially repeating distances along the CD of the belt, as shown in FIG. 12. The most prominent repeating peaks are labeled as 1-5 in FIG. 12. We have noted that such regularly repeated peaks of MD line contact profile sums are often found in belts having offset openings, as described herein. However, the distance along the CD that the most prominent peak repeats significantly varies with the angle of offset from the MD line. In this regard, TABLE 1 below shows the distance in the CD direction that the most prominent peak of MD line contact profile sums repeats for belts having a configuration as shown in FIG. 11, but with different offset angles relative to a line along the MD direction.

TABLE 1

| MD line offset angle | Distance in CD Between Most Prominent Repeating Peaks (mm) |
|---|---|
| 0 | 1.411 |
| 3 | 1.411 |
| 6 | 1.411 |
| 9 | 1.411 |
| 12 | 1.587 |
| 13 | 0.410 |
| 14 | 0.410 |
| 15 | 0.410 |
| 16 | 0.552 |
| 17 | 0.552 |
| 18 | 0.552 |
| 19 | 0.552 |
| 20 | 0.552 |
| 21 | 0.552 |
| 24 | 0.847 |
| 27 | 0.847 |
| 30 | 0.847 |
| 33 | 0.847 |
| 36 | 0.847 |
| 39 | 0.552 |
| 42 | 0.552 |
| 45 | 0.410 |
| 48 | 1.587 |

It is notable that the distance in the CD direction between the prominent repeating peaks for the belts shown in TABLE 1 starts out relatively large when the offset angle is small, e.g., the distance was about 1.4 mm for the belts having offset angles of 0-9 degrees. However, at an offset angle of 13 degrees, the distance between the most prominent repeating peaks sharply fell to about 0.4 mm, and stayed relatively low (below about 0.55 mm) for all of the belts having 13-21 degrees of offset. Then, starting at an offset angle of 24 degrees, the distance between the prominent repeating peaks becomes large again. We believe that the short distances between the most prominent repeating peaks of MD contact profile sums for the belts having offset angles in the range of 13-21 degrees is indicative of a property of the belts that facilitates the transfer of the web onto the belts, as described above.

Processes

Another aspect of our invention is directed to processes for making paper products, with such processes using belts as described herein for a creping operation. In such processes, any of the papermaking machines of the general types described above may be used. Of course, those skilled in the art will recognize the numerous variations and alternative configurations of papermaking machines that can be used for performing the inventive processes described herein. Moreover, those skilled in the art will recognize that the well-known variables and parameters that are a part of any papermaking process can be readily determined and used in conjunction with the inventive processes, e.g., the particular type of furnish for forming the web in the papermaking process can be selected based on desired characteristics of the product.

In some TAD processes according to embodiments of the invention, the web is at a consistency (i.e., solids content) between about 15 percent to about 25 percent when transferred onto the creping belt. In other, non-TAD processes according to embodiments of the invention, belt creping occurs under pressure in a creping nip while the web is at a consistency between about 30 percent to about 60 percent. In such processes, a papermaking machine may have, for example, the configuration shown in FIG. 1 and described above. Details of such a process can be found in the aforementioned U.S. Pat. No. 8,394,239 B2. In this process, the web consistency, a velocity delta occurring at the belt-creping nip, the pressure employed at the creping nip, and the belt and nip geometry act to rearrange the fiber while the web is still pliable enough to undergo structural change. Without being bound by theory, it is believed that the slower surface speed of the creping belt causes the web to be substantially molded into openings in the creping belt, with the fibers being realigned in proportion to the creping ratio. Some of the fibers are moved to the CD orientation, while other fibers are folded to MD ribbons. As a result of this creping operation, high caliper sheets can be formed. Multilayer belts with openings arranged in offset lines, as described herein, are well-suited for these processes.

A further aspect of processes according to embodiments of the invention is the application of a vacuum to the creping belt. As described above, a vacuum may be applied as the web is deposited on the creping belt in a papermaking process. The vacuum acts to draw the web into the openings in the creping belt. Notably, in processes involving a multilayer belt structure both with and without the use of a vacuum, the web is drawn into the plurality of openings in the top layer of the multilayer belt structure, but the web is not drawn into the bottom layer of the multilayer belt structure. In some of the embodiments of the invention, the applied vacuum is about 5 in. Hg to about 30 in. Hg. As described in detail above, the bottom layer of the multilayer belt acts as a sieve to prevent fibers from being pulled through the belt structure. This bottom layer sieve functionality is particularly important when a vacuum is applied, as fibers are prevented from being pulled through to the vacuum box structure that creates the vacuum.

Paper Products

The following trials demonstrate high-quality paper products that can be made in embodiments of our invention.

Towel grade basesheets were made using a belt having the configuration of BELT 6 shown in in FIG. 7. The trials were conducted on a papermaking machine similar to the machine shown in FIG. 1, with a non-TAD process where the sheet was transferred onto the belt at a higher consistent velocity (as described above). Parameters of this trial are shown in TABLE 2.

TABLE 2

| | |
|---|---|
| Furnish Blend | Yankee Layer: 100% SSWK |
| | Air Layer: 55%/45% SSWK/SHWK |
| Layer Split | 65/35 Air/Yankee |
| Fabric Crepe | 15%-30% |
| Reel Crepe | 2% |
| Molding Box Vacuum | 5 in. Hg-24 in. Hg |
| Crepe Blade Bevel | 15° |
| Basis Weight Target | 15.5 lbs/ream |
| Caliper Target | Float |
| MD Tensile Target | 1400 g/in$^3$ |
| CD Tensile Target | 1400 g/in$^3$ |
| CD Wet Tensile | 400 ± 70 g/in$^3$ |

Additionally, towel basesheets made from a belt having the configuration of BELT 6 were also converted per the specifications shown in TABLE 3.

TABLE 3

| | |
|---|---|
| Number of Plies | 2 |
| Roll Diameter (inch) | 5.70-6.05 |
| Sheet Count | 120-160 |
| Sheet Length (inch) | 5.9-7.0 |
| Sheet Width (inch) | 11.0 |

Results of the trials are shown in FIGS. 13 and 14, with properties of the basesheets being shown in FIG. 13, and properties of the converted products being shown in FIG. 14. As will be appreciated by those skilled in the art, the products show outstanding properties.

Tissue grade basesheets were made using BELT 4 shown in FIG. 7. The trials were conducted on a papermaking machine similar to the machine shown in FIG. 1, using a non-TAD process, as described above. Three different furnishes were used in the trials: an integrated furnish of 65% HW and 35% SW, a premium furnish of 65% Eucalyptus (Euc) and 35% NSWK, and a furnish with 100% Euc. Parameters of the trials are shown in TABLE 4.

TABLE 4

| | |
|---|---|
| Furnish Blend | (1) 65% HW and 35% SW, |
| | (2) 65% Euc and 35% NSWK, |
| | (3) 100% Euc |
| Layer Split | 100% HW to Yankee layer |
| | 70% SW 30% NHW to M&A |
| Fabric Crepe | 23% |
| Real Crepe | 8% |
| Molding Box Vacuum | 24 in. Hg |
| Basis Weigh Target | 12-15.5 lbs/ream |
| Caliper Target | 82-110 mils/8 sheets |
| MD Tensile Target | 520-820 g/in$^3$ |
| CD Tensile Target | 250-380 g/in$^3$ |

Some of the tissue basesheets made in this trial were converted per the specifications shown in TABLE 5.

TABLE 5

| | |
|---|---|
| Number of Plies | 2 |
| Roll Diameter (inch) | 4.45 |
| Sheet Count | 176 |
| Sheet Length (inch) | 4.00 |
| Sheet Width (inch) | 4.00 |

TABLE 5-continued

| | |
|---|---|
| Roll Compression | 18% |
| Core Diameter (inch) | 1⅝ |

Results of the trials are shown below, with properties of the basesheets shown in FIGS. 15-17, and properties of the converted products being shown in FIG. 18. As will be appreciated by those skilled in the art, the products show outstanding properties.

Figure 19A:
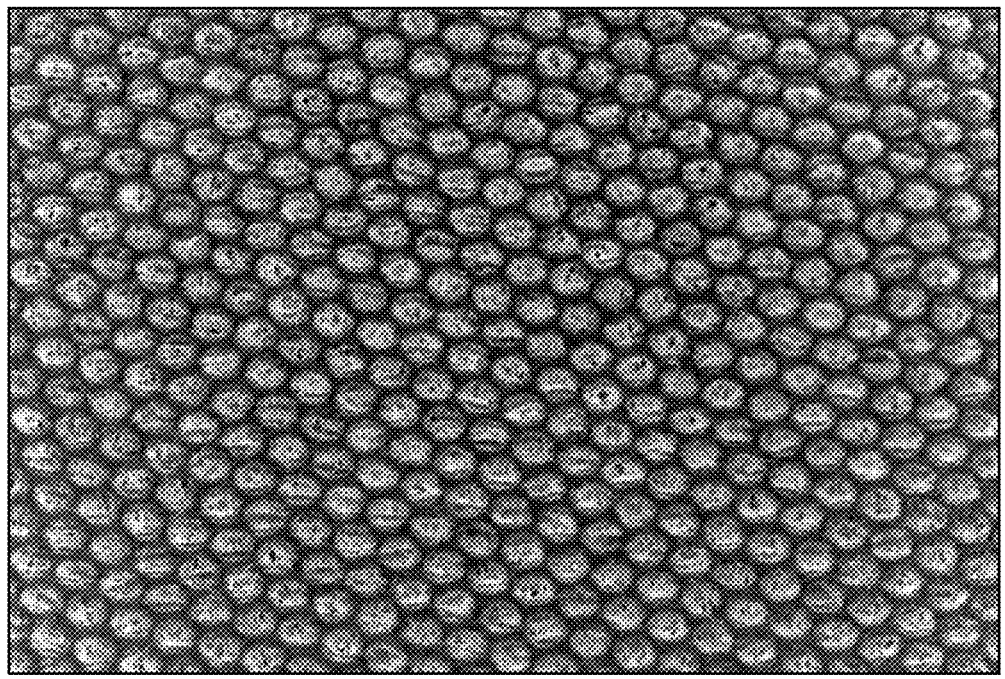
FIGS. 19A and 19B are photomicrographs of basesheets according to embodiments of the invention.
Figure 19B:
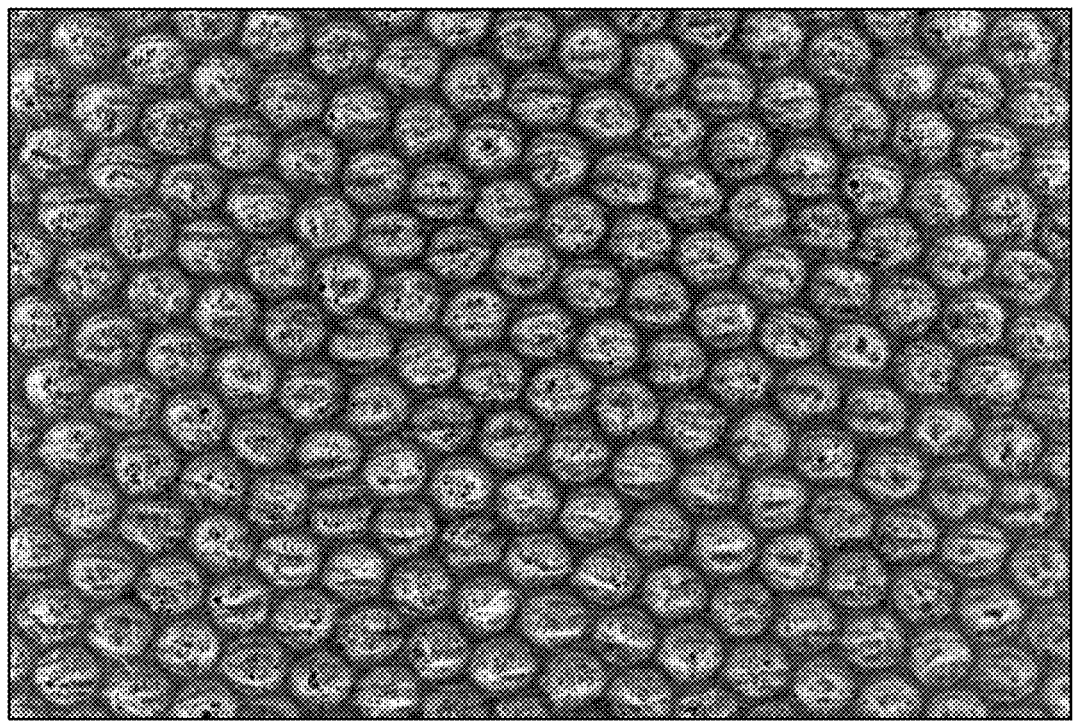

FIG. 19A is a photomicrograph of a tissue-grade basesheet made in the trials with BELT 4 described above, and FIG. 19B is a photomicrograph of a towel-grade basesheet made with BELT 5 shown in FIG. 7. In these photomicrographs, the round, lighter regions are the domes that were formed in the offset lines of openings of the creping belt, and the darker regions between the domes are connecting regions that were formed on the contact (top) surface of the creping belt. As is apparent from the photomicrographs, the domes have the same arrangement as the openings in the creping belts. That is, the domes are formed along lines that are offset from a line along the MD (vertical in the figure) and offset from a line along the CD (horizontal in the figure). Because the domes are offset in the MD and CD in the same manner as the openings in the creping belts, the domes have the same properties as the openings in the creping belts described above. For example, for every line along the MD, a length of the line across a dome is different from lengths of the line across the adjacent domes on both sides of the dome. As another example, there are hexagonal patterns of domes having a rotational symmetry of 60°, and there are not mirror images about the MD and CD lines along the diameter of the center dome of each hexagonal pattern.

Although the openings in creping belts are often circular, such circular openings may nevertheless shape the web to produce domes in the paper products that have an elliptical shape. Such elliptically-shaped domes may appear when the openings in the creping belt have diameters of about 1.5 mm or more. Another unique aspect of paper products according to embodiments of our invention is related to the elliptical nature of the domes found in some of the products. We have found that the major axes of elliptically shaped domes in some of our inventive products are oriented at different angles relative to the CD, as compared to other paper products having elliptically shaped domes. We believe that this difference stems from the lines of offset openings found in the creping belts as described herein.

Figure 20A:
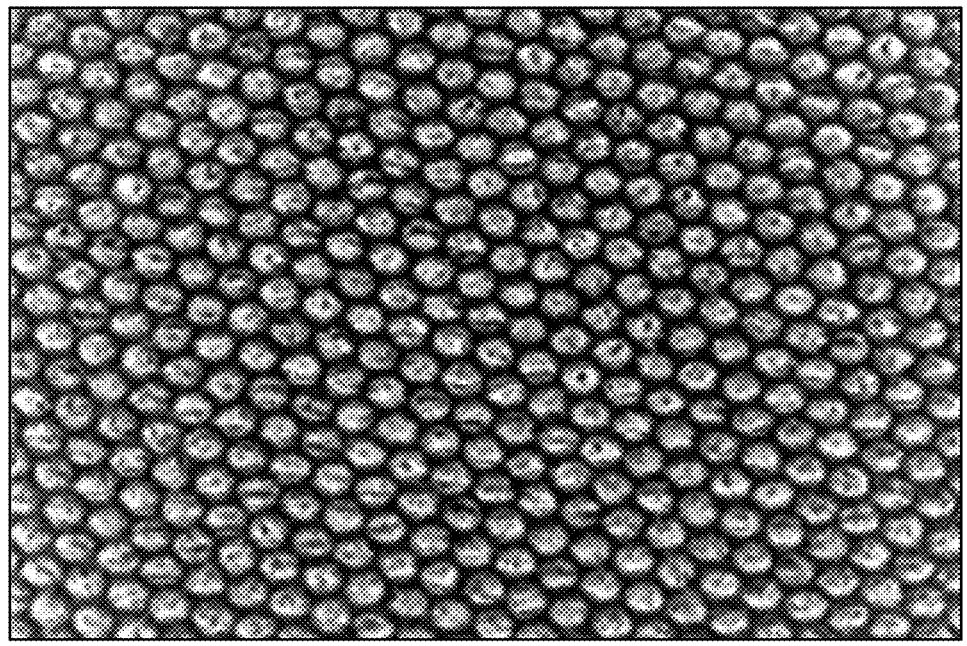
FIG. 20A is a photomicrograph of a paper product according to an embodiment of the invention and FIG. 20B is a black and white image converted from the photomicrograph, respectively.
Figure 20B:
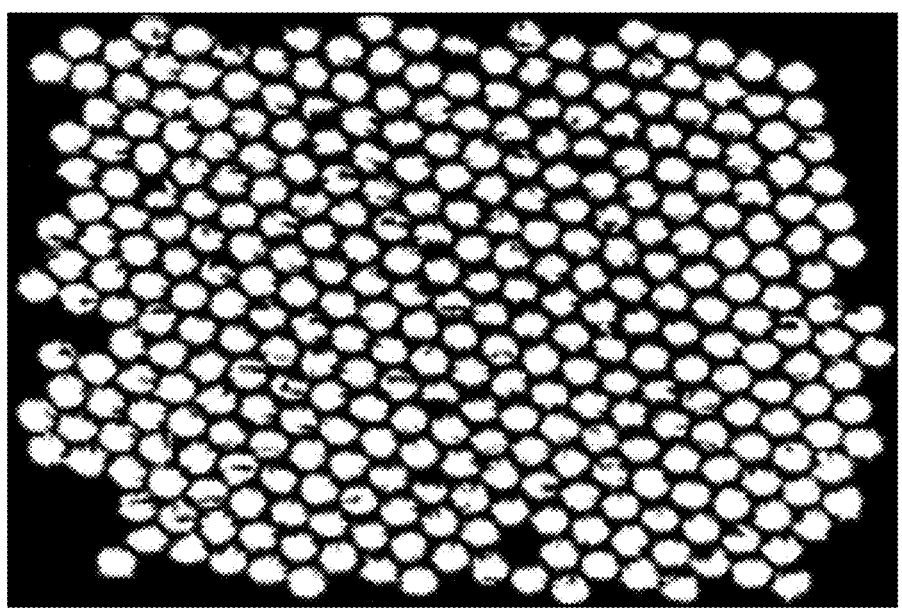

This difference in the orientation angle of the major axis of the domes can be determined using image analysis software, such as Wolfram Mathematica by Wolfram Research of Champaign, Ill. An example of steps for calculating the orientation angle of the major axes of the domes will now be described. First, a grayscale photomicrograph of a paper product is converted to a black and white representation of the photomicrograph. An example of such a photomicrograph and its converted black and white representation are shown in FIGS. 20A and 20B. To make the conversion, a cutoff is set such that parts of the grayscale image that are darker than the cutoff level are made black, and parts of the grayscale image that are lighter than the cutoff level are made white. As can be seen in the converted image shown in FIG. 20B, the domes appear white and the connecting regions between the domes appear black.

To facilitate the analysis, the orientation of the products in photomicrographs used to make the black and white converted representations should be noted and kept the same when comparing different products. For example, in the photomicrograph shown in FIG. 20A, the MD of the product is aligned vertically and the CD is aligned horizontally, and, thus, the MD and CD are aligned vertically and horizontally, respectively, in the black and white converted representation shown in FIG. 20B as well. Given black and white representations with a known alignment, the image analysis software can be used to calculate the orientation of the major axis, as well as other elliptical properties of the domes such as the elongation of the domes, the length of the major axis of the domes, the length of the minor axis of the domes, etc.

Using such image analysis, the elliptical properties of domes in products according to embodiments of the invention were compared to the elliptical properties in domes of other paper products. The results are shown in TABLE 6 below. Products 1-3 were made using creping belts having offset lines of openings. Specifically, Products 1 and 2 were made by a belt having the configuration of BELT 4 shown in FIG. 7, and Product 3 was made by a belt having the configuration of BELT 6 shown in FIG. 7. For comparison, Products 4-8 were made using creping belts that did not have offset openings, e.g., the openings in the belts had openings that were aligned in the MD. All of the Products 1-9 were made using the same papermaking machine and the same general methodology, with parameters such as reel crepe and/or conversion factors being varied.

TABLE 6

| Product | Median Major Axis Orientation Angle (deg) | Median Major Axis Length (mm) | Median Minor Axis Length (mm) | Median Elongation | Number of Domes Counted |
| --- | --- | --- | --- | --- | --- |
| 1 | −4.6 | 1.49 | 1.09 | 0.27 | 1337 |
| 2 | −4.7 | 1.48 | 1.20 | 0.20 | 1168 |
| 3 | −3.9 | 2.08 | 1.79 | 0.15 | 588 |
| 4 | −1.0 | 1.72 | 1.24 | 0.29 | 1033 |
| 5 | −0.4 | 1.62 | 1.09 | 0.33 | 1242 |
| 6 | 0.4 | 2.26 | 1.67 | 0.27 | 522 |
| 7 | −2.2 | 2.25 | 1.66 | 0.27 | 486 |
| 8 | 2.5 | 2.10 | 1.80 | 0.15 | 614 |

In the results shown in TABLE 6, the angle of orientation is measured relative to a line along the CD, with a positive angle meaning a counterclockwise direction from the CD line, and a negative angle meaning a clockwise direction from the CD line. Note as well that "count" in TABLE 6 refers to the number of domes that were inspected in the determination of the orientation, elongation, and major and minor axis measurements. Note further that the elongation in TABLE 6 is computed as 1−(major axis length/minor axis length), and, thus, is indicative of how elliptical the domes are shaped.

As can be seen in the results shown in TABLE 6, the products made with the belts having offset lines of openings had different orientations in the major axes of their domes as compared to the orientations of the major axes of the domes of the products made from the belts not having offset openings. Specifically, the major axes of the domes of Products 1-3 had median orientations of about 4 to 5 degrees in the clockwise direction. On the other hand, the major axes of the domes of Products 4-8 had median orientations of their major axis that were significantly more in the opposite (counterclockwise) direction, with the orientations ranging from about 2 in the clockwise direction to about 2.5° in the counterclockwise direction. The difference in the orientations is all the more noteworthy given the otherwise similarity in the elliptical properties of the domes, with the medians for the lengths of the major and minor axes being relatively similar for all of the products. Without being bound by theory, we believe that this difference in the orientations is a result of the areas of the belts that contact the webs when the webs are transferred onto the belts. As discussed above, in the creping nip the papermaking web is transferred onto the top side of the creping belt, and in this process, the cellulosic fibers of the web are repositioned and oriented. Thus, the contact area of the belt has a significant influence on the transfer operation and the subsequent fiber orientation in the web. And, as also discussed above, the contact area of a belt having offset lines of openings is significantly different compared to the contact areas of belts that do not have offset lines of openings. We believe that these different contact areas of the creping belts produced the observed differences in the orientations of the major axes of the domes.

The paper products in embodiments of our invention have relative densities indicative of the processes of making the products with creping belts. To understand this aspect of our invention, a technique can be used to provide a representation of the local fiber density in paper products, such as those of our invention, at resolutions on the order of the base resolution of three dimensional X-ray micro-computed tomographic (XR-μCT) representations obtained from synchrotron or laboratory instruments. An example of such a laboratory instrument is the MicroXCT-200 by XRadia, Inc. of Pleasanton, Calif. Specifically, with the technique described below, a perpendicular (normal) fiber density can be determined at a center surface of a paper product. Note, the density may vary in the out-of-plane direction due to embossments, creping, drying features, etc.

With the fiber density determination technique, XR-μCT data sets are received after they have undergone a Radon Transform or a John Transform to convert radially projected X-ray images into three-dimensional data sets consisting of stacks of two-dimensional grayscale images. For example, paper product data received from the synchrotron at the European Synchrotron Radiation Facility in Grenoble, France, consists of 2000 slices, each with dimensions of 2000×~800 pixels with eight bit grayscale values. The grayscale values represent the attenuation of mass, which, for a material of a relatively uniform molecular mass, closely approximates the three-dimensional distribution of mass or formation. Paper products consist principally of cellulosic fibers, so an assumption of a constant X-ray attenuation coefficient, and therefore a direct relationship between grayscale and mass, is valid.

XR-μCT data sets generated from the Radon or John Transform show the void space as a finite grayscale value, and mass at a higher grayscale value, in a range from 0 to 255. The slice images also show visible artifacts that originate when the paper product sample moves during the exposure, or from imprecise movement of the rotational or z-positioning stage. These artifacts appear as lines projecting from the mass in various orientations. If the paper product sample is rotated within the X-ray beam on an axis perpendicular to the principal plane of the paper product sample, it may also contain a "ringing" artifact, and a center "pin" of a higher grayscale that must be addressed, since this indicates mass that does not exist in the paper product sample. In particular, this may be the case for XR-μCT data sets received from a synchrotron.

A segmentation process refers to the separation of different phases of the material contained in a paper product sample. This is merely distinguishing between solid cellulose fibers and air (void space). In order to obtain representative tomographic data sets, the following segmentation process can be employed using the open software called ImageJ which is a public domain, image processing program developed at the United States National Institute of Health. First, images are homogenized through the use of diffusion techniques with edge detection and conditional means filtering, and binarization is used as the primary method of segmentation. Next, the stack of image is subjected to particle identification and removal, where a particle is defined as any component that is non-continuous to the main body of the scan. Finally, grayscale from the original scan data are reinstituted over the fully segmented one bit image. All slices are treated in the same manner, so that a data set is generated that clearly distinguishes between fiber mass and void space.

Relative density of a paper product sample can be calculated from the segmented XR-μCT data sets by first generating surfaces that approximate the upper and lower boundaries of the sample, and then calculating a center surface between the two. Surface normal vectors, which are determined at each position within the center surface, are then used to determine the mass per volume within a cylinder that is 1×1 pixels times the distance (in pixels) between the upper and lower surface along the surface normal vector. All calculations can be performed using MATLAB® by MathWorks, Inc. of Natick, Mass. A specific procedure includes surface determination, surface normals and three-dimensional thickness, three-dimensional density, and three-dimensional density representations, as will now be described.

For surface determination, slices in XR-μCT data sets are X-Z projections where the X-Y plane is the principal plane of the sample and is the same plane formed by the MD or CD. Therefore, the Z-axis is perpendicular to the X-Y plane and each slice represents a unit step in the Y direction. Thus, each slice will produce a curve connecting the maximum (upper) and minimum (lower) positions of the fibers indicated in the slice.

Those regions where no mass can be found along the Z-axis, i.e., where a through-hole exists within the material, can present a problem for creating a continuous center surface. To overcome this, holes can be filled by dilating the hole (increasing the hole size) by two pixels around the periphery, and the average value can be determined for the surrounding positions that have finite Z values for maximum, minimum or center, depending on the surface being adjusted. The hole can then be filled with the average Z-position value so that no discontinuity occurs, and so that surface smoothing will not be adversely influenced by the void space.

A robust three-dimensional smoothing spline function can then be applied to each surface. An algorithm for performing this function is described by D. Garcia, Computational Statistics & Data Analysis, 54:1167-1178 (2010), the disclosure of which is incorporated by reference in its entirety. The smoothing parameter can be varied to produce a series of files that provide a range of surface smoothness that presents individual fiber detail to a greater or lesser extent.

Three-dimensional surface normals can be calculated at each vertex within the smoothed center surface using the MATLAB® function "surfnorm." The algorithm is based on a cubic fit of the x, y, and z matrices. Diagonal vectors can be computed and crossed to form the normal. Line segments, parallel to the surface normal that pass through each vertex and terminate at the upper and lower smoothed surfaces can be used to determine the thickness of a paper product sample in a direction perpendicular to the center surface.

The three-dimensional relative fiber density is determined along a pathway perpendicular to the center surface by assuming a right rectangular prism with two dimensions being one pixel and the third as the length of the line segment extending from the two external smoothed surfaces through the vertex. The mass contained within that volume is determined as the voxels have a finite mass as indicated by the grayscale value from the tomographic data set. Thus, the maximum relative density at a vertex is equal to one if all of the voxels along the line segment contain have a grayscale value of 255. The maximum value for the cell walls of cellulosic fibers is taken to be 1.50 g/cm$^3$.

A convenient representation of the three-dimensional fiber density can be made by mapping the fiber density in four dimensions using the smoothed center surface to show the extent of out-of-plane deformation for the sample, and indicating the three-dimensional density as a spectral plot with values at each location within the map. These maps may be shown as relative density with maximum values of 1, or normalized to the density of cellulose with a maximum of 1.50 g/cm$^3$ as indicated.

Figure 21A:
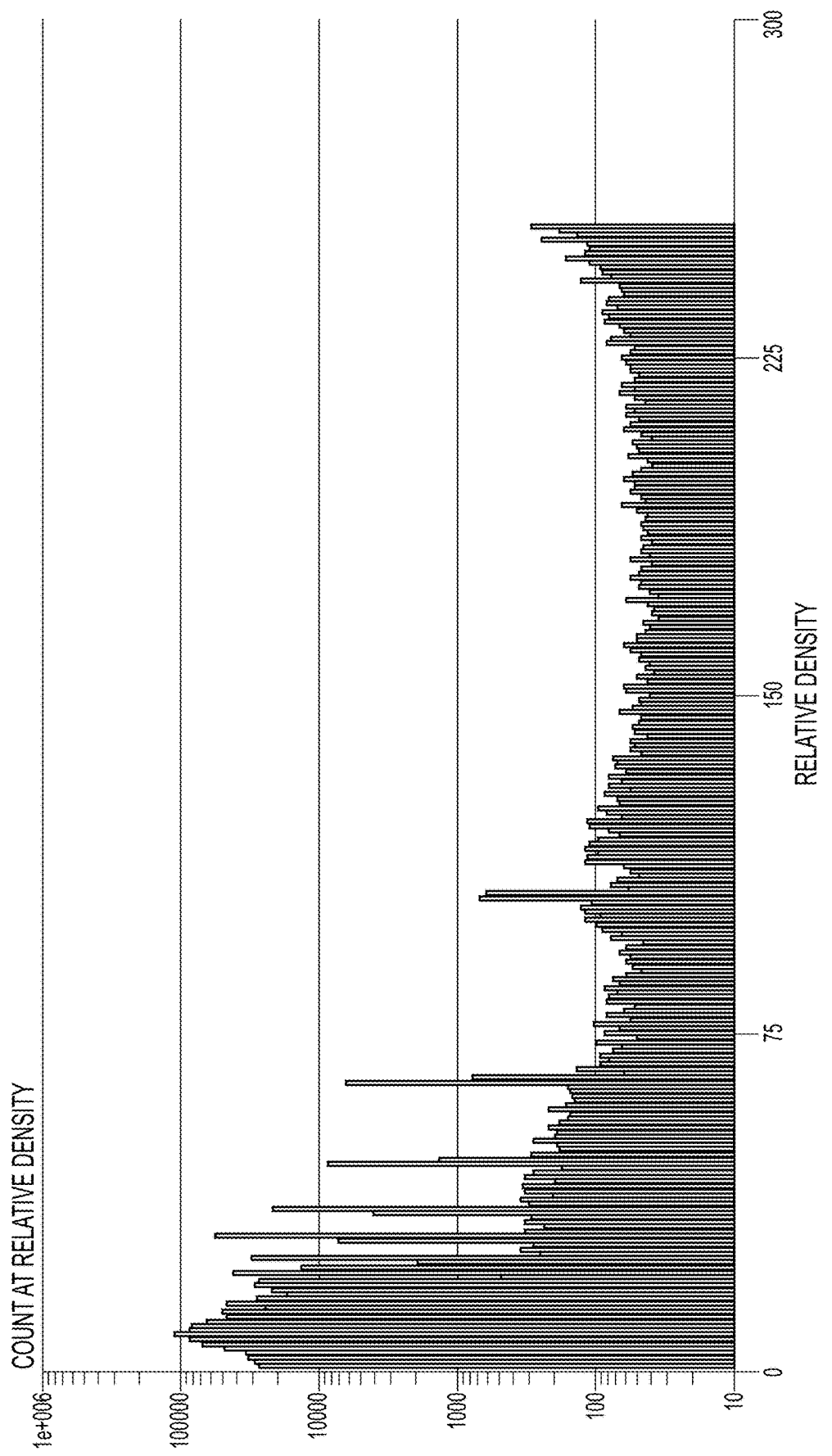
FIGS. 21A-21D show XR-μCT analysis of a paper product according to an embodiment of our invention and a comparison paper product made with a structuring fabric.
Figure 21B:
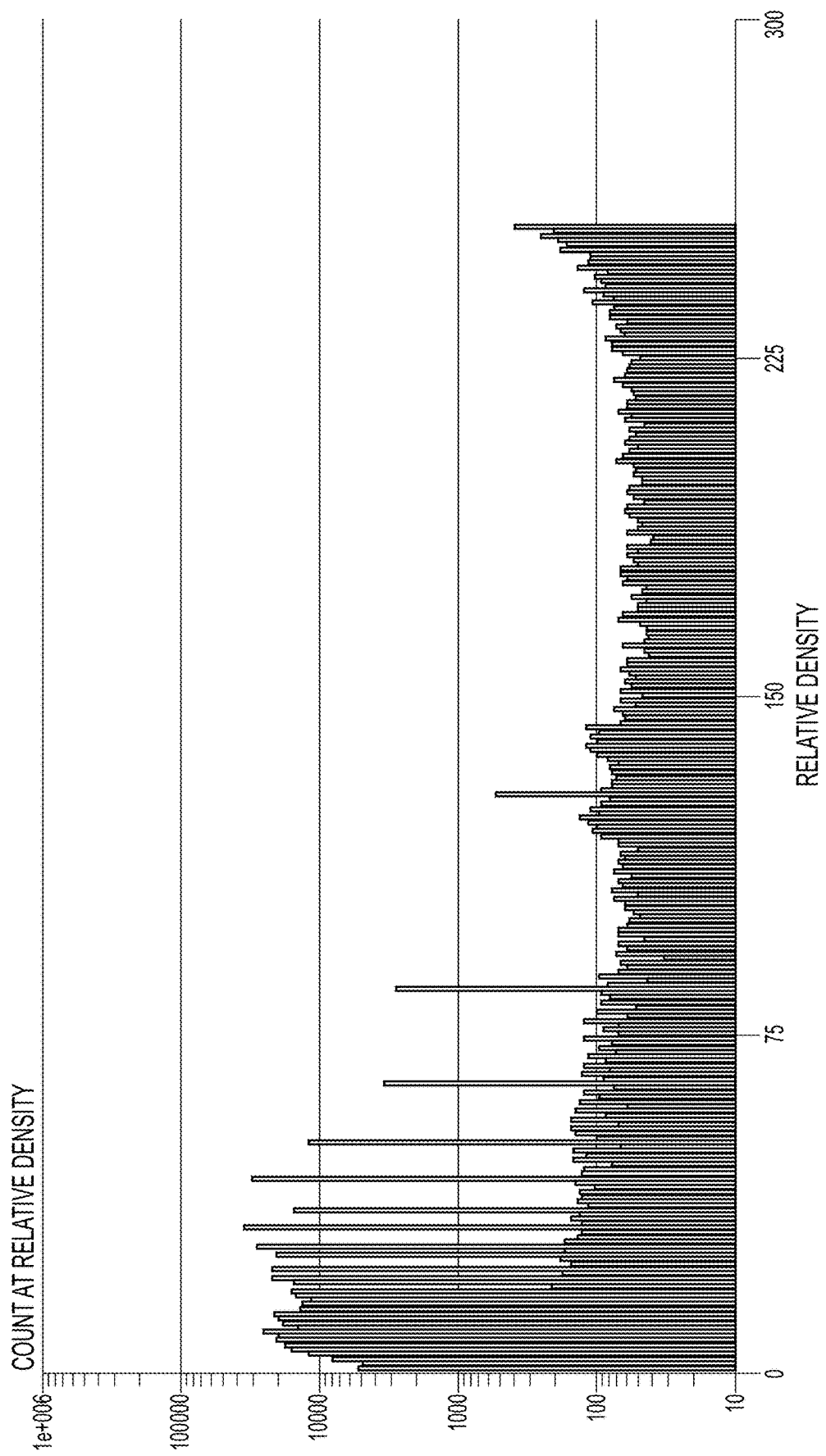
Figure 21C:
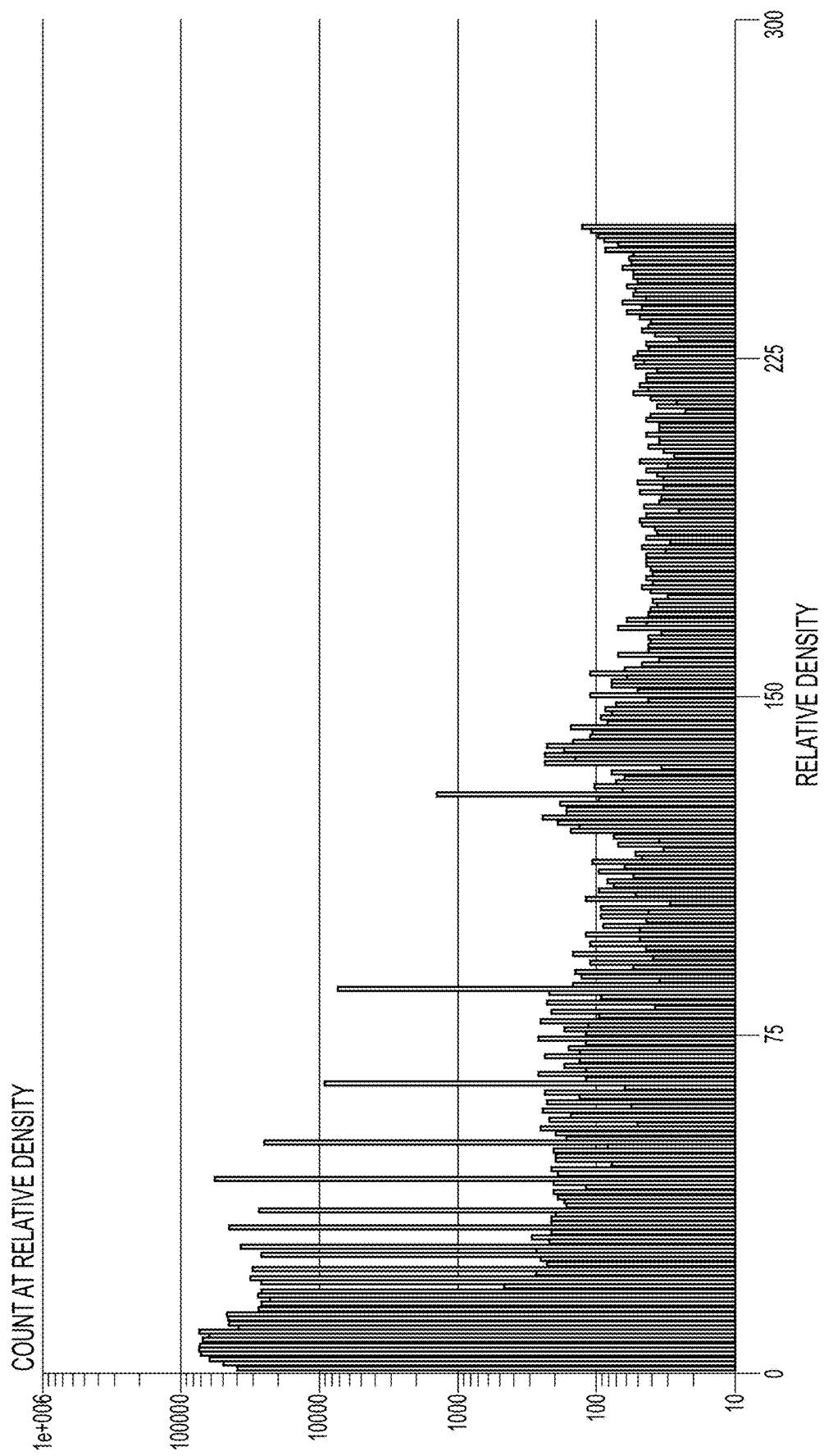
Figure 21D:
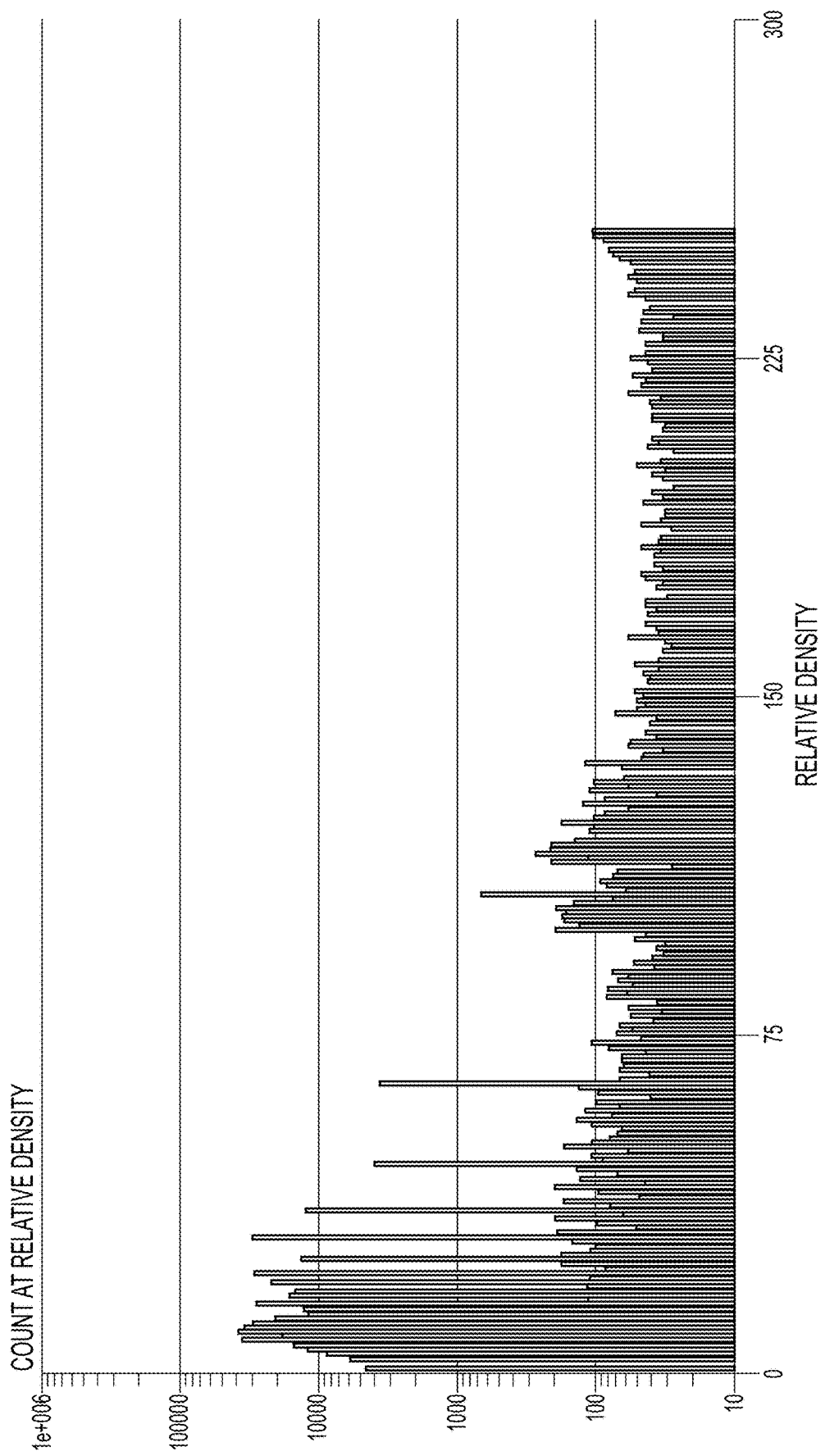

FIGS. 21A and 21B show histograms of XR-μCT relative density determinations for a paper product made using BELT 4 shown in FIG. 7. In particular, FIG. 21A shows the density determination for a dome of the paper product, and FIG. 21B shows the density determination for a connecting region of the paper product. For comparison, FIGS. 21C and 21D show histograms of XR-μCT relative density determinations for a paper product made using a woven structuring fabric. As discussed above, structuring fabrics are well-known alternatives to creping belts in papermaking processes. As is also well known in the art, paper products made with structuring fabrics include dome regions that are formed in pockets between the woven yarns of the structuring fabric during the papermaking process, and there are connecting regions that are formed on the knuckles making up the forming surface of the structuring fabric in the papermaking process. FIG. 21C shows the density determination for dome formed in a pocket region of the fabric, and FIG. 21D shows the density determination for a connecting region of the paper product that was formed on a knuckle of the fabric. In all of FIGS. 21A-21D, the x-axis shows the relative density values, and the y-axis shows the number of pixels at each relative density value (on a logarithmic scale).

Using the analysis shown in FIGS. 21A-21D, it was determined that the mean value for the relative density of the dome formed in the opening of the creping belt (FIG. 21A) was about 14.9, and the mean value for the relative density of the dome formed in the pocket of the fabric (FIG. 21C) was about 16.8. Further, the mean value of the relative density for the connecting area formed on the contact surface of the creping belt (FIG. 21B) was about 24.0, whereas the mean value of the relative density for the connecting area formed on the knuckle in the structuring fabric (FIG. 21D) was about 18.5. Thus, the average relative density of the dome formed by the belt was about 12% less than the density of the dome formed by the structuring fabric, whereas the average relative density of the connecting area for the product formed with the belt was about 30% higher than the average relative density for the connecting area formed on the structure fabric. We have found these relations to also be the case for paper products made from other creping belts in comparison to paper products made from other structuring fabrics. That is, there are lower relative densities of the domes in products made from creping belts than the relative densities of domes in products made from structuring fabrics, and higher relative densities in the connecting areas in products made from creping belts than the relative densities of the connecting areas in products made from structuring fabrics. Thus, the average relative densities of the different regions (domes and connecting areas) for paper products are indicative of whether the products were made with a creping belt or a structuring fabric.

Although this invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

INDUSTRIAL APPLICABILITY

The apparatuses, processes, and products described herein can be used for the production of commercial paper products, such as toilet paper and paper towels. Thus, the apparatuses, processes, and products have numerous applications related to the paper product industry.

We claim:

1. A multilayer belt for creping a web in a papermaking process, the belt having a machine direction (MD) of travel in the paper making process and a cross-machine direction (CD) orthogonal to the machine direction (MD) and the multilayer belt comprising:
   a first layer providing a first surface of the belt on which the web is deposited for a creping operation in the papermaking process, and the first layer having a plurality of openings extending therethrough, with the openings being arranged in rows that are offset from each of the machine direction (MD) and the cross-machine direction (CD) of the belt such that (i) rows of the openings are arranged in lines that are offset by an angle α from a line along the machine direction (MD) and (ii) other rows of the openings are arranged in lines that are offset by an angle β from a line along the cross-machine direction (CD), such that, for every line along the MD, a length of the line across an opening is different from lengths of the line across adjacent openings on both sides of the opening, and (ii) for each line along the CD, a length of the line across an opening is different from lengths of the line across adjacent openings on both sides of the opening; and
   a second layer attached to the first layer, the second layer providing a second surface of the belt.

2. The multilayer belt according to claim 1, wherein the openings are circular and have diameters of about 0.5 mm to about 5.0 mm.

3. The multilayer belt according to claim 2, wherein the openings are circular and have diameters of about 0.75 mm to about 2.5 mm.

4. The multilayer belt according to claim 1, wherein the first layer of the belt has a contact area of about 10% to about 90%.

5. The multilayer belt according to claim 1, wherein the openings are arranged in rows that are rotated by about twelve (12) degrees to about twenty-one (21) degrees in relation to the line along the MD.

6. The multilayer belt according to claim 1, further comprising an additional layer between the first layer and the second layer.

7. The multilayer belt according to claim 1, wherein the first layer of the belt is the top layer, the top layer being the portion of the belt on which the web is deposited for the creping operation.

8. The multilayer belt according to claim 1, wherein the first layer of the belt is bonded to the second layer by an adhesive.

9. The multilayer belt according to claim 1, wherein one of the first layer and the second layer is a polymeric layer.

10. The multilayer belt according to claim 1, wherein the second layer of the multilayer belt is a bottom layer forming a bottom side of the belt, the bottom side being an air side facing and contacting processing equipment.

11. The multilayer belt according to claim 10, wherein the processing equipment is a creping roll and a vacuum box.

12. The multilayer belt according to claim 10, wherein the bottom layer imparts strength and durability to the top layer.

13. The multilayer belt according to claim 1, wherein the openings of the top layer pass through the top layer from one side of the layer to the other.

14. The multilayer belt according to claim 13, wherein the openings impart dome shapes to the papermaking web in the papermaking process.

15. The multilayer belt according to claim 1, wherein the top layer of the multilayer belt is made from an extruded flexible thermoplastic material.

16. The multilayer belt according to claim 1, wherein the top layer is polyurethane having a coefficient of friction from about 0.5 to about 2.

17. The multilayer belt according to claim 1, wherein the top layer is a polyester thermoplastic elastomer with conducive friction, compressibility, and tensile properties for the papermaking process.

18. The multilayer belt according to claim 1, wherein the openings in the top layer are identical in size and shape.

19. The multilayer belt according to claim 1, wherein the openings in the top layer have different configurations in size and shape.

20. The multilayer belt according to claim 19, wherein some of the openings are sized or shaped for forming dome structures in the papermaking web during the creping operation whereas other openings are of a greater size and a varying shape to provide patterns in the papermaking web.

21. The multilayer belt according to claim 20, wherein the patterns are equivalent to patterns achieved with an embossing operation.

22. The multilayer belt according to claim 1, wherein the first layer has a top surface having a coating that increases or decreases the function of the top surface.

23. The multilayer belt according to claim 22, wherein the coating changes the release property of the top surface.

24. The multilayer belt according to claim 1, wherein the second layer is a bottom layer of the belt and also includes openings.

25. The multilayer belt according to claim 24, wherein the openings in the bottom layer are smaller in cross-sectional area than those in the top layer.

26. The multilayer belt according to claim 24, wherein the openings in the bottom layer prevent cellulosic fibers from being pulled completely through the multilayer belt.

27. The multilayer belt according to claim 24, wherein the bottom layer is a woven fabric.

28. The multilayer belt according to claim 24, wherein the bottom layer has an air permeability that allows air to be drawn through the multilayer belt.

29. The multilayer belt according to claim 24, wherein the bottom layer is an extruded thermoplastic material.

30. The multilayer belt according to claim 29, wherein the extruded thermoplastic material imparts strength, stretch resistance, and durability to the multilayer belt during the papermaking process.

31. The multilayer belt according to claim 29, wherein the thermoplastic material is selected from the group consisting of polyesters, copolyesters, polyamides, and copolyamides.

32. The multilayer belt according to claim 29, wherein the thermoplastic material is polyethylene terephthalate (PET).

33. The multilayer belt according to claim 24, wherein the bottom layer is a metallic screen.

34. The multilayer belt according to claim 24, wherein the bottom layer is a material formed from para-aramid synthetic fibers.

35. The multilayer belt according to claim 24, wherein the top layer of the belt is a polymeric layer and the bottom layer is a fabric.

36. The multilayer belt according to claim 24, wherein the top layer of the belt is an extruded polymeric layer and the bottom layer is an extruded polymeric layer.

37. The multilayer belt according to claim 24, wherein the top layer and the bottom layer are joined by any one of chemical means, adhesive, double coated tape, mechanical means, a hook and loop fastener, heat welding, laser fusion, and lamination.

* * * * *